US010165108B1

(12) United States Patent
Douglas

(10) Patent No.: US 10,165,108 B1
(45) Date of Patent: Dec. 25, 2018

(54) LOCK SCREEN OPTIMIZATIONS

(71) Applicant: Amazon Technologies, Inc., Reno, NV (US)

(72) Inventor: Michael Douglas, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/386,949

(22) Filed: Dec. 21, 2016

Related U.S. Application Data

(60) Provisional application No. 62/406,918, filed on Oct. 11, 2016.

(51) Int. Cl.
*H04M 1/725* (2006.01)
*G06Q 30/02* (2012.01)
*G06F 3/0481* (2013.01)
*G06Q 30/06* (2012.01)
*H04W 12/06* (2009.01)
*G06K 9/00* (2006.01)

(52) U.S. Cl.
CPC .... *H04M 1/72577* (2013.01); *G06F 3/04817* (2013.01); *G06Q 30/0262* (2013.01); *G06Q 30/0267* (2013.01); *G06Q 30/0643* (2013.01); *H04W 12/06* (2013.01); *G06K 9/00013* (2013.01)

(58) Field of Classification Search
CPC ............... H04M 1/72577; G06Q 30/0241
See application file for complete search history.

(56) References Cited

U.S. PATENT DOCUMENTS

| 6,550,010 B1* | 4/2003 | Link, II | G06F 21/31 713/168 |
| 2013/0124276 A1* | 5/2013 | Brown | G06Q 30/0241 705/14.4 |
| 2015/0133199 A1* | 5/2015 | Lee | G06Q 30/0241 455/566 |
| 2015/0310493 A1* | 10/2015 | Chitnis | G06Q 30/0267 705/14.64 |
| 2016/0006678 A1* | 1/2016 | Jung | G06Q 10/10 726/19 |
| 2016/0171204 A1* | 6/2016 | Tanaka | G03G 15/502 726/17 |

* cited by examiner

*Primary Examiner* — Christopher M Brandt
(74) *Attorney, Agent, or Firm* — Hogan Lovells US LLP

(57) ABSTRACT

Approaches are described for determining, updating, and displaying recommended content on a display of a computing device. A lock screen can be displayed in response to a wake event. An input icon, such as a fingerprint icon, can be displayed on the lock screen to prompt the user to use a corresponding input mechanism to unlock the device. Upon authenticated input being determined, a countdown icon or timer element can be displayed indicating any remaining or additional time for the recommended content to be displayed. After any remaining time has passed, the device is unlocked and alternative content displayed, either automatically or in response to an additional access input received from a user.

20 Claims, 14 Drawing Sheets

LOCK SCREEN OPTIMIZATIONS

CROSS-REFERENCE TO RELATED APPLICATIONS

This application claims priority to U.S. Provisional Application No. 62/406,918, filed Oct. 11, 2016, entitled "Lock Screen Optimizations," the entirety of which is incorporated herein by reference for all purposes.

BACKGROUND

Mobile electronic devices, such as smart phones, tablet computers, and wearable computing devices (e.g., watches, glasses, among others), are becoming more ubiquitous. People are increasingly using their mobile devices to obtain the information for going about their everyday lives. As people spend a greater amount of their time on these devices, it can be helpful for their devices to offer suggestions of media content or physical items that might be of interest, and provide sufficient opportunity for the user to consume that content. Discussed herein are technical solutions to provide improved systems for displaying suggestions to people.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the foregoing or other deficiencies experienced in conventional approaches for presenting content data via an electronic device. In particular, various embodiments provide for determining, displaying, and/or updating content data anywhere messages and/or notifications may be presented to a user on a computing device. For example, a lock screen can include content data that can include advertisements and/or other such information. The content data can be displayed according to one of a number of templates (e.g., a full-screen template or a non-full-screen template). Each type of template can include selectable elements (e.g., at least a portion of the template relative to what is displayed on the screen) that, when selected, can cause the computing device to perform an action such as launch an application, provide additional content displays, etc. In order to ensure that sufficient time is provided for a user to be able to read the presented content on the lock screen, various embodiments provide a period of time after authentication for which the content will remain displayed if no specific user action is taken. In at least some embodiments, the user can have the option of providing an input or taking an action that can cause the lock screen content to be dismissed in order for the home screen, or other such content, to be displayed in its place.

Figure 1A:
FIGS. 1A, 1B, and 1C illustrate a first example approach to displaying content on a display screen of a computing device in accordance with various embodiments.
Figure 1B:
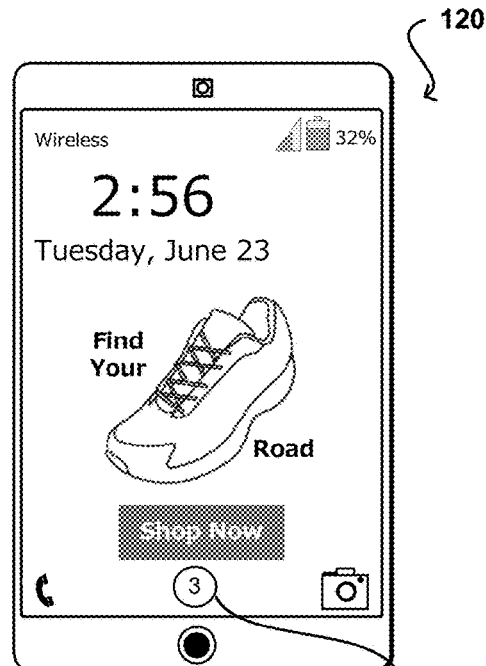
Figure 1C:
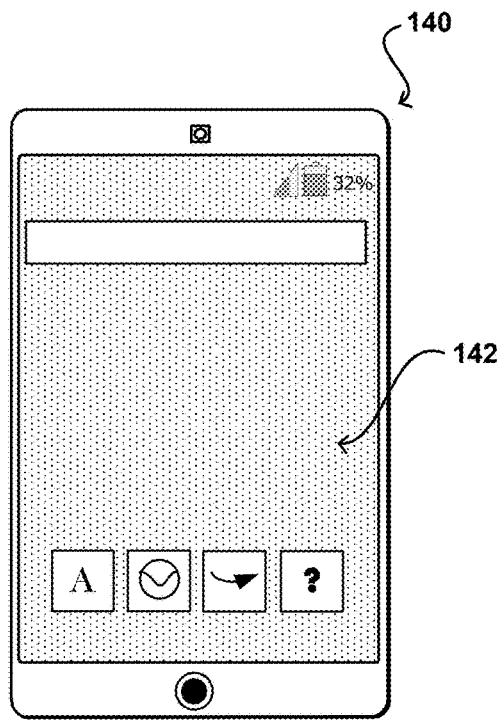

For example, FIGS. 1A through 1C illustrate an example approach to displaying content on a lock screen that can be utilized in accordance with various embodiments. In this example a biometric sensor, such as a fingerprint scanner embedded in a home button 106 of the computing device, can be used to unlock the computing device 108. A user can perform an action to cause the display screen to be activated, such as may correspond to the user moving or touching the device, among other such options. As discussed in more detail later herein, recommended content 102 is displayed on a lock screen displayed on the display screen 110 as illustrated in the example 100 of FIG. 1A. In this example, a fingerprint icon 104 is displayed in place of a lock icon in order to indicate to a user, or potential user, that not only is the device in a locked state, but that the device can be unlocked using the fingerprint scanner. For other types of biometric data there can be other types of icons displayed as well, such as an eye icon for a retina or iris scanner, a face icon for a facial recognition system, a microphone icon for a voice recognition algorithm, and the like. Further, at least some devices will allow for unlocking to be performed using one or more other approaches as well, such as by swiping across a touch sensitive display and entering a password or personal identification number (PIN), among other such options. At least one additional option may be provided in case the biometric scanner or data is unable to be used to authenticate the user, such as where an amount of moisture or deformation of the user's finger causes problems with the feature point recognition or other approach used to validate the fingerprint of the user. In some embodiments the fingerprint scanner will capture a digital image of a fingerprint pattern of a finger placed proximate the scanner and software will attempt to locate a pattern(s) or features (e.g., arches, loops, or whorls) that can be used to authenticate the user by comparing the pattern(s) or features against data stored for the user.

Once an identity of the user has been authenticated, through data captured by the fingerprint scanner or otherwise, a determination can be made as to whether any promotional, advertising, or other supplemental content should be provided for display on the lock screen, and whether there is a desired amount of time for which that content is to be displayed after an unlock action. In some embodiments, advertising content 102 is to be displayed for a minimum amount of time on the lock screen after the device is unlocked, such as for at least three or five seconds. The advertiser may have paid an amount for the advertising based on this minimum amount of time. In the example 120 of FIG. 1B the lock screen is displayed for three seconds after authentication before a different screen is displayed. In order to inform a user as to the reason that the lock screen is still displayed, and to provide information about the remaining time for the lock screen to be displayed after a successful unlocking of the device, a countdown icon 122 or other such element can be displayed that can indicate the amount of time remaining for the lock screen to be displayed. For situations where the advertising content 102 is to be displayed for at least a minimum amount of time, the countdown icon 122 can indicate the number of seconds left before the minimum time is reached. Various other timing approaches and values can be used as well within the scope of the various embodiments. The countdown icon 122 can be displayed with the number of seconds decreasing monotonically until the specified or minimum amount of time has passed, after which the lock screen may no longer be displayed and the device can display another interface, screen, or page, such as a home screen 142 as illustrated in the example 140 of FIG. 1C. In at least some embodiments the user can provide input (i.e., through a dismissal action) during the countdown in order to dismiss the lock screen and/or access the functionality of the device. For example, since the user has already successfully been validated and caused the device to be unlocked, the user can provide a dismissal action such as a swipe, button press, or other such input in order to cause the lock screen to no longer be displayed. Various other types of actions or inputs can be used to dismiss the lock screen as well within the scope of the various embodiments.

Various types of content can be displayed on a lock screen of a computing device. For example, display instructions, content data, and/or templates to display the content data can be associated with a content provider and stored on a computing device. An example of content data includes recommend content. The recommended content can be tailored to a user of the computing device. For example, as will be described further herein, the recommended content inserted into the templates can be based on the geographic location of the computing device, usage data as relating to social media applications associated with the user of the computing device, web applications, and various other applications, search queries, purchase history, among other types of information. The display instructions can be executed by the computing device to determine a display schedule, whereby the display schedule can be used to determine whether to update the recommended content, to set a frequency at which the recommended content is displayed, a time at which the recommended content is displayed, the type of template used to express the recommended content, placement of the recommended content on a display screen, among other such display options.

The recommended content can be updated in response to detecting a lock screen event. Lock screen events include, for example, swiping away a lock screen where no security pin is required to access a home screen or other user interface of the computing device, changing a user's enrollment status in receiving recommended content from a content provider, updating a user profile with a content provider, swiping away a lock screen where a security pin is required to access a home screen or other user interface of the computing device, dismissing a security lock guard (e.g., pin entry, biometric entry, etc.) and returning to a lock screen, displaying a notification pane, launching or dismissing a camera application over a lock screen, dismissing a non-full-screen template that includes recommended content, displaying a notification overflow window, dismissing a notification overflow window, receiving a notification when a full-screen template that includes recommended content is being displayed, dismissing all notifications displayed on top of a full-screen template that includes recommended content, launching a dialer application over the lock screen, dismissing a dialer application from the lock screen, launching a voice assist application over the lock screen, dismissing a voice assist from the lock screen, powering on a display screen, powering off a display screen, activating a security key guard, activating a phone dialer application, detecting a reboot intent of the computing device, determining, while a display screen of a computing device is in a powered off state, that the computing device transitions from a state where no notifications are visible to where at least one notification would be visible or the computing device transitions from a state where notifications are visible to a state where no notifications are visible, among other such examples.

The lock screen events can be generated in response to, for example, detecting a user interaction with a display screen of the computing device, detecting a physical button of a computing device being pressed a predetermined number of times, detecting a graphical button of a computing device being contacted a predetermined number of times, detecting a time out event, detecting particular movement of the computing device, receiving an input from a different computing device (e.g., a smart watch), receiving input from an object (e.g., a cover of the computing device with a magnet that causes the display screen to power on/off), etc.

In various embodiments the user interaction can include a user authentication action in which a user provides information useful in authenticating the user. In various embodiments this can involve the use of a biometric sensor, such as a fingerprint scanner, of the computing device. The user interaction can involve at least a portion of a finger of a user being detected by a fingerprint scanner, for example, such as by capturing data representative of at least a portion of a user fingerprint. At least some initial processing of the data captured by the sensor can be performed in order to determine that the data exhibits a pattern corresponding to a human fingerprint. The fingerprint data can be compared against fingerprint data stored for an authorized user of the computing device, and if the fingerprint data matches (or is otherwise determined to correspond to) the stored data for the authorized user then the device can be unlocked and made accessible to the authenticated user. While the lock screen is displayed, a fingerprint icon or other graphical element can be displayed in order to prompt the user to unlock the device using the fingerprint scanner or a similar biometric sensor or unlock/authentication mechanism. If advertising or other promotional or supplemental content is displayed on the lock screen, there might be a minimum amount of time for which that content is to be displayed. If the content has not yet been displayed for the minimum amount of time, a countdown element can be displayed that indicates a remaining amount of time until the home screen or other functionality of the computing device will be accessible. In some embodiments a default amount of time will be applied between a time when the fingerprint data is authenticated and when the home screen is displayed. In some embodiments an unlocked icon, or similar graphical element, can be displayed once an end event has been detected, such as it being determined that the minimum amount of time has been reached or a dismissal event has been detected. The display of the unlocked icon can informing a user that the device is unlocked and the home screen or other functionality can be accessed by an access action, such as by pressing a button on the device or performing a motion or gesture with respect to a touch-sensitive display, among other such options.

In accordance with various embodiments, as the user interacts with the recommended content (e.g., selects the recommended content) and/or computing device, a user profile that includes usage information can be created and/or updated, and the user profile can be used to update the display schedule such that recommended content is provided in accordance with the updated display schedule. In response to a selection of the recommended content, the computing device can perform at least one action, such as launching a web browser to view a product listing of an item or service represented in the recommended content, navigating to a particular web site, launching an application, or performing some other action.

Figure 2A:
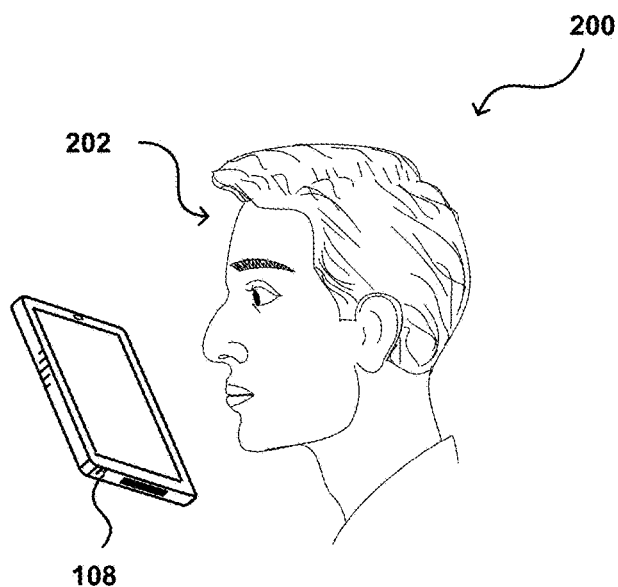
FIGS. 2A and 2B illustrate an example implementation where a user is interacting with a lock screen of a computing device in accordance with various embodiments.

FIG. 2A illustrates an example implementation 200 wherein a user 202 is interacting with a computing device 204, in accordance with various embodiments. Although a portable computing device (e.g., an electronic book reader, smart phone, or table computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, wearable computers (e.g., watches, glasses, etc.) and portable players, among others. In this example, the computing device can have executing thereon a content rendering service that can determine, display, and update content data on a lock screen of a touch-sensitive computing device 204. An example of content data includes recommend content, which can include, for example, rich media content, advertisements, graphics, text, selectable elements, etc. It should be noted, however, that embodiments described herein provide for determining, displaying, and updating recommended content anywhere messages and/or notifications may be presented to a user on a computing device. This can include displaying recommended content on a background of a home screen of a computing device, as in-app content, in a notification area of a computing device, among other such areas messages and/or notifications may be presented. The home screen of a computing device can include, for example, the visual interface from which a user is able to access particular functions. Home screens are not identical as users can arrange interface elements (e.g., icons representing applications) as desired, and home screens can differ across operating systems. The home screen can display links or other selectable elements to applications, settings, and notifications. In accordance with various embodiments, a home screen can include, for example, a grid of application links or shortcuts that can be arranged over multiple pages, and serve as a method of accessing functions of the computing device. A home screen can include a background image. The background image can be a digital image (photo, drawing etc.) used as a decorative background of a graphical user interface on the home screen of the computing device. Displaying recommended content as in-app content can include, for example, displaying recommended content within an application, such as banners at the top, bottom, or other location in the application. The notification area of a computing device can display, for example, system and application notifications, as well as user selectable elements to access system settings and applications. It should be noted that notification areas are not identical and can differ across operating systems. The notification area can be displayed, for example, by dragging down from a top of a display screen of a computing device, selecting a button (physical or graphical), etc. Notifications may be selected, which can redirect the user to the application where the notification was initially created, and marking that alert as read. Once a notification is read, it is removed from the notification area. Users may also remove notifications without reading them by deleting individual notifications.

In accordance with various embodiments, a lock screen is a type of graphical user interface (GUI) that is displayed on a touch-sensitive display screen when the display screen is "locked," or programmed to restrict access to aspects of the computing device. For example, the lock screen can regulate immediate access to the computing device by requiring a certain action in order to receive access: such as entering a password as part of authenticating a security key guard, using a certain button combination as part of authenticating a security key guard, or by performing a certain gesture using a device's touchscreen as part of authenticating a security key guard. Functionality of the computing device and private data is limited to pre-configured access settings that are determined either by default or when the computing device is unlocked.

The lock screen can be displayed upon detecting an input that "wakes" the display screen. An example input can include pressing a physical button such as a home button (see 912 of FIG. 9), a voice input, movement of the computing device, an input from a different computing device (e.g., a smart watch), an input with an object (e.g., a magnet of a cover used to cover the computing device), etc. Example physical buttons include a home button (see reference 912 of FIG. 9), a power button (see reference 908 of FIG. 9), a volume button (see reference 906 of FIG. 9), etc. In accordance with an embodiment, a home button can be a physical button that when pressed can cause a display screen of a computing device to power on, close an active application, navigate to a home screen, or perform any one of a number of functions based on a number of times the home button is pressed, how long the home button is held after being pressed, etc. In accordance with an embodiment, the power button can be a physical button that when pressed can sleep/wake a computing device, power on/off a computing device, or perform any one of a number of functions based on a number of times the power button is pressed, how long the power button is held after being pressed, etc. In accordance with an embodiment, the volume button can be a physical button that when pressed can control a volume of a computing device or perform any one of a number of functions based on a number of times the volume button is pressed, how long the button is held after being pressed, etc. In various embodiments, the buttons (e.g., the home button, the power button, and the volume button) can be pressed in one or more combinations and/or sequences to perform any one of a number of functions based on a number of times each button is pressed, how long each button is held after being pressed, etc. It should be noted that in various embodiments, the buttons can be graphical buttons or a combination of physical buttons and graphical buttons.

In accordance with certain embodiments, once the lock screen is displayed, the lock screen can be unlocked to enable certain computing device settings and other computing device functionality. In various embodiments, however, the lock screen does not have to be unlocked to utilize computing device functionality. For example, pressing a physical button a predetermined number of times may launch a camera application that can be used to capture image data (e.g., a still image, video, etc.) In another example, pressing a physical button can wake a display screen of a computing device and the user can perform a gesture (e.g., swipe) to launch or display graphical elements that when selected can launch one of a number of applications executing on the computing device. In the situation where the computing device is unlocked to access private data and/or additional functionality, the unlock process can include, for example, verifying the user's identification with a passcode as part of authenticating a security key guard, using facial identification approaches to verify the user's identity as part of authenticating a security key guard, using fingerprint recognition approaches to verify the user's identity as part of authenticating a security key guard, using voice identification approaches to verify the user's identity as part of authenticating a security key guard, etc.

Figure 2B:

Example 220 of FIG. 2B illustrates an example lock screen that can be displayed in accordance with various embodiments. The lock screen can be displayed in response to detecting a wake event to power on the display screen. The lock screen can display, for example, advertising or promotional content 124, although other information can be displayed as well as may include the time and date, notifications for various applications executing on the computing device such as missed text notifications, missed call notifications, calendar event notifications, etc.; a background image (i.e., wallpaper); interactive elements that can include a call icon to launch a phone application, an unlock icon to launch a security key guard, a camera icon to launch a camera application, status elements that indicate a Wi-Fi connection, telecomm connection, battery level, etc., among other types of information. Some functional elements may be included as well, such as a selectable element 126 enabling purchase of an item represented in the advertising content. The lock screen can display various other types of recommended content as well as discussed in more detail elsewhere herein.

In the example 220 of FIG. 2B the home button of the computing device includes a biometric sensor, such as a fingerprint scanner. It should be understood that various other types of biometric sensors, such as retinal scanners, can be utilized as well and that such sensors or components can be incorporated into the home button or included elsewhere on, or connected to, the computing device. In this example, a type of displayed lock icon can be based at least in part upon a type of biometric data that can be used to unlock the computing device. In this example a fingerprint icon 104 is displayed indicating that the device is currently in a locked state but can be unlocked using the fingerprint scanner, although other unlock approaches may be utilized as well within the scope of the various embodiments. Once data is received from the biometric scanner that can be used to authenticate the identity of the user, the computing device 108 can be unlocked and a home screen or other such interface displayed that enables the user to access various functionality that was previously unavailable when the device was in the locked state.

In accordance with various embodiments, the lock screen can additionally be utilized to display recommended content in templates. The recommended content can be displayed instead of (or addition to) the background image of the lock screen. The recommended content can include, for example, text, images, audio, animation, video, interactive content, rich media content, advertisements, and other content a user or other object can interact with. Content can be, for example, information provided through text, images, audio, animation, video, interactive content, rich media content, etc. The content can be recommended content because, for example, the content is personalized based on user information associated with a user as may include a user's demographic information, such as gender, age, marital status, occupation, income level, etc., information indicating usage patterns of a computing device, information indicating applications executing on the computing device, a physical location of the computing device, a network provider (Wi-Fi and/or telecom) of the computing device, etc. The recommended content can include a hypertext link or other selectable element that can enable the computing device to launch a web browser, navigate to a particular web site, launch an application, or perform some other function. The web site can be a product page that displays information associated with the recommended content as well as provide the ability to purchase an item represented on the product page.

As will be described further herein, the recommended content can be determined, displayed, and updated in accordance with display instructions. As described herein, the display instructions can be periodically and automatically updated. For example, a service (e.g., an update service) can provide updated display instructions as such instructions become available, at determined times, or as otherwise appropriate. In accordance with various embodiments, the display instructions can be used to cause the computing device to determine, display, and update the recommended content at specific times, under specific conditions, and/or in response to a particular lock screen event. For example, the computing device can determine that a current time of day is within a determined time segment specified by a display schedule of the display instructions and can enable recommended content to be displayed. In other examples, the computing device can determine, display, and/or update recommended content in response to a lock screen event. Example lock screen events include swiping away a lock screen where no security pin is required to access a home screen or other user interface of the computing device, changing a user's enrollment status in receiving recommended content from a content provider, updating a user profile with a content provider, swiping away a lock screen where a security pin is required to access a home screen or other user interface of the computing device, dismissing a security lock guard (e.g., pin entry, biometric entry, etc.) and returning to a lock screen, displaying a notification pane, launching or dismissing a camera application over a lock screen, dismissing a non-full-screen template that includes recommended content, displaying a notification overflow window, dismissing a notification overflow window, receiving a notification when a full-screen template that includes recommended content is being displayed, dismissing all notifications displayed on top of a full-screen template that includes recommended content, launching a dialer application over the lock screen, dismissing a dialer application from the lock screen, launching a voice assist application over the lock screen, dismissing a voice assist from the lock screen, powering on a display screen, powering off a display screen, activating a security key guard, activating a phone dialer application, detecting a reboot intent of the computing device, determining, while a display screen of a computing device is in a powered off state, that the computing device transitions from a state where no notifications are visible to where at least one notification would be visible or the computing device transitions from a state where notifications are visible to a state where no notifications are visible, among other such examples.

Example situations where recommended content is determined, displayed, and/or updated can occur when returning from an application launched over the lock screen, where in this situation any recommended content displayed in a full-screen template is cleared and any recommended content displayed in a non-full-screen template remains displayed. In another situation where the computing device is returning from a camera application that was launched by pressing a power button (or other such button) a predetermined number of times, the recommended content displayed in a full-screen template can be updated and any recommended content displayed in a non-full-screen template can remain unchanged. In yet another situation where a security key guard or other such security interface that requires an input to access a home screen of the computing device is dismissed, recommended content can be cleared. In another situation where a computing device shut down process is initiated, recommended content can be cleared. In yet another situation, recommended content displayed in a full-screen template can be cleared when an application is launched over the lock screen. In another situation, recommended content displayed in a non-full-screen template can cleared when that recommended content is cleared via a swiping gesture. It should be noted that other lock screen events can cause a computing device to determine, display, and/or update recommended content as will be obvious to one of ordinary skill in the art.

Figure 3A:
FIGS. 3A, 3B, and 3C illustrate example templates to display recommended content that can be displayed on a lock screen of a computing device in accordance with various embodiments.

As described, the computing device can cause the recommended content to be displayed on the lock screen in one or more of a number of different visual representations. FIG. 3A illustrates an example 300 of a full-screen template that includes content data that can be displayed on a lock screen of a computing device 108. As described, an example of content data includes recommend content. In this example, the background image portion 304 of the lock screen has been replaced with full-screen template 306 that includes recommend content, which in this example includes a display of a shoe, text, and an interactive element 308. The background image portion 304 can be a digital image (photo, drawing etc.) used as a decorative background of a graphical user interface on the lock screen of the computing device 108 or other electronic device. It should be noted that although most devices come with a default background, users or other processes can change the background. As described, the recommended content can be inserted in one of a number of templates (e.g., full-screen template, notification template, or banner template) and the recommended content can be displayed on the lock screen of the computing device. A template can be used to provide a standard layout and look and feel within content regions of the lock screen or other display areas. The layout can include regions or areas, and content can be inserted into those regions. Inserting content can include referencing particular content to be displayed in the regions of the template.

The interactive element 308, when selected, can cause the computing device to perform one of a number of actions. Example actions include launching an application such as a web browser to view a webpage, a marketplace application to download an application, among others. In this example, the interactive element can cause a mobile shopping app to launch, wherein a product page for the shoe as well as any additional or related information can be displayed. In the situation where the user has a passcode or other security measure securing the computing device, the user would first have to provide the necessary passcode before viewing the product page. On the product page, the user can purchase the product, search additional products, or resume operation of the computing device. It should be noted that although the recommended content in the full-screen template is shown in this example, it will be appreciated that the visual representation of the recommended content is not limited to the full-screen template. For example, the recommended content can be displayed in a non-full-screen template which includes but is not limited to a banner template, a notification template, or any other template that utilizes substantially less than all of the pixels of the display screen when rendered. In various embodiments, the display screen can include other displays coupled and/or otherwise in communication with the computing device. For example, the displays can include a secondary screen such as an e-ink screen, LCD screen, LED screen, etc. Additionally or alternatively, the display can be a display screen of a device in communication with the computing device such as a smart watch, smart glasses, mobile phone, automobile display, television, electronic book reader, portable media player, among others. As will be appreciated by one of ordinary skill in the art, a product or other content to be represented in recommended content can be a tangible item, a virtual item, a service, or a combination thereof.

Figure 3B:

FIG. 3B illustrates example 320 of notification template 322 that includes recommended content that can be displayed on a lock screen of the computing device. In this example, the notification template is intended to match a style of the notifications used by the computing device. As shown, the recommended content is displayed with a text message 322 and appears as though it could be another text message displayed along with the text message. Although the recommended contented is displayed with a text message notification, notification template 324 can be the only notification displayed, or displayed with one or more other notifications, as may include missed call notifications, missed text message notifications, calendar event notifications, etc. Notification template 324 includes recommended content which may include a graphical representation of an advertisement, a description associated with the advertisement, and any other appropriate information such as a label distinguishing the provided advertisement from other device generated notifications. In this example, recommended content in the notification template includes an image of a shoe with information indicating that the product is on sale. A user can interact with the recommended content. For example, the user can tap, select, swipe, or otherwise interact with the recommended content in a same or similar manner as with other notifications. Selecting the recommended content can cause the computing device to display additional information, launch an application, or perform some other action.

Figure 3C:

In another example, a banner template 342 can include recommended content as shown in example 340 of FIG. 3C. Although the recommended content displayed in a banner template is displayed with a text message 320, the recommended content can be displayed with any number of types of notifications. Further, like the recommended content displayed in a notification template, the recommended content can be displayed after all other notifications, before all other notifications, or somewhere mixed in with any other notifications. The visual representation of banner template 342 generally utilizes a larger area of the lock screen and is emphasized with respect to other displayed notifications. For example, the banner template 342 can appear on the lock screen in the form of a bar, column, or box and may utilize, for example, up to twice the viewable area of a notification generated by the operating system. As shown, the recommended content in the banner template includes information such as an image of an advertisement (e.g., shoes), a description associated with the advertisement (e.g., price and advertising phrase), and any other appropriate information. The size and appearance (e.g., banner style, bold lines, etc.) can visually distinguish the banner template from other notifications. As with the other templates, a user can interact with the recommended content in the banner template. For example, the user can tap, select, or swipe the recommended content in the banner template, wherein such interaction can cause the computing device to display additional information, launch an application, or some other action.

The template used to display the recommended can be based on the presence of any notifications on the lock screen. For example, in the situation where at least one notification is being displayed on the lock screen, the recommended content can be generated in one of a banner template or a notification template. In the situation where no or zero notifications are being displayed on the lock screen, the recommended content can be generated in a full-screen template. In the situation where there are a few notifications being displayed (e.g., three or less), the recommended content can be generated in a banner template. In the situation where three or more notifications are being displayed on the lock screen, the recommended content can be generated in a notification template. In the situation where ten or more notifications are being displayed, no recommendations may be displayed. It should be noted that other events can trigger the use of one visualization style over another visualization style. It should further be noted that these events may also be used to determine whether recommended content should be displayed.

For example, many operating systems include predefined notification categories to specify the type of notification object being displayed. Example notification categories include alarms and timers, calendar events, incoming direct messages (SMS, instant message, etc.) In accordance with various embodiments, the notification categories can be leveraged to determine a time to display the recommended content. For example, it may not be desirable to display recommended content when a user is responding to a calendar event, as the user has a specific intent in mind. Instead, the recommended content might be displayed some amount of time after the calendar event. As an example, if the time between when a notification is detected and when a user waking the display screen is less than, for example, fifteen seconds, then recommended content is not displayed.

In another example, operating systems may assign a notification priority to a notification. These priorities can influence 'how' and 'when' notifications should be displayed on a display screen. For example, a priority of "MAX" may be used for a critical or time-sensitive notification. In this example, if the time between a notification being displayed with a "MAX" priority and the user waking the display screen is less than, for example, fifteen seconds, then recommended content is not displayed. In yet another example, the total number of notifications displayed on a lock screen can be used to determine whether to display recommended content. For example, in the situation where, for example, ten or more notifications are present on the lock screen when the display screen is turned on, then recommended content may not be displayed at that time.

In accordance with various embodiments, the advertisements, content, or other information inserted into the template can be tailored for a user of the computing device. This can include tailoring the frequency at which recommended content is displayed (i.e., the rate at which content is displayed or otherwise provided) on the lock screen, the placement of the recommended content on the lock screen, when the recommended content is displayed on the lock screen, and/or the visualization of the recommended content. For example, the time of day to which the recommended content is displayed on the lock screen can be selected to minimize distraction and increase viewership of the recommended content. For example, in the situation where a user utilizes the computing device for a brief period of time in the morning, and more so in the evening, it might be beneficial to increase the display of recommended content on the lock screen at a time the computing device is most likely to be used and/or checked (i.e., in the evening). Providing recommended content during a time the user is infrequently unlocking the computing device or otherwise is attempting to briefly use the device can be distracting and may lead to an unsatisfactory experience.

In various embodiments, the recommended content inserted into the templates can be tailored based on user information as may include the user's demographic information, such as gender, age, marital status, occupation, income level, etc., information indicating usage patterns of the computing device, information indicating applications on the computing device, a physical location of the computing device, a network provider (Wi-Fi and/or telecom) of the computing device, etc. For example, the name of the carrier network used by the computing device can be determined and recommended content can determined based on the carrier network name can be inserted in the template. For example, if the user's carrier is identified, content can be included in the template for a competing carrier. In another example, the computing devices Wi-Fi and/or GPS setting can be determined to tailor content included in the template based on the computing devices physical location. For example, in the situation where the Wi-Fi network is identified with a particular restaurant, recommended content for that restaurant can be inserted into a template and displayed on the lock screen of the computing device. In yet another example, application activity on the computing device can be monitored, where the activity can include notifications, the time of those notifications, etc. The activity can be used to determine a time to display recommended content. For example, the fact that a user is accessing social media websites and/or applications, might indicate that a user of the computing device available to receive content, which can then be displayed on the lock screen of the computing device.

In accordance with various embodiments, other factors can cause the frequency, placement, and/or appearance of advertisements to be adjusted or otherwise modified. For example, if a complaint or other indication is received that indicates that the user is not satisfied with the frequency, placement, and/or appearance of the advertisements, the frequency, placement, and/or appearance at which the advertisements are displayed to the user can be decreased or otherwise modified. In this way, feedback received from the user can be used to adjust the rate at which and/or the placement of the displayed advertisements. Additionally, how often a user clicks, selects and/or otherwise interacts with an advertisement (such as the user's clickthrough rate), and/or any other number of customer behaviors can be used to adjust the advertising frequency (and/or placement and appearance of the advertisements). For example, advertisement frequency can be decreased, and/or placement and/or appearance of advertisements made less intrusive if a user selects or otherwise interacts with the displayed advertisements to increase a clickthrough rate.

Figure 4A:
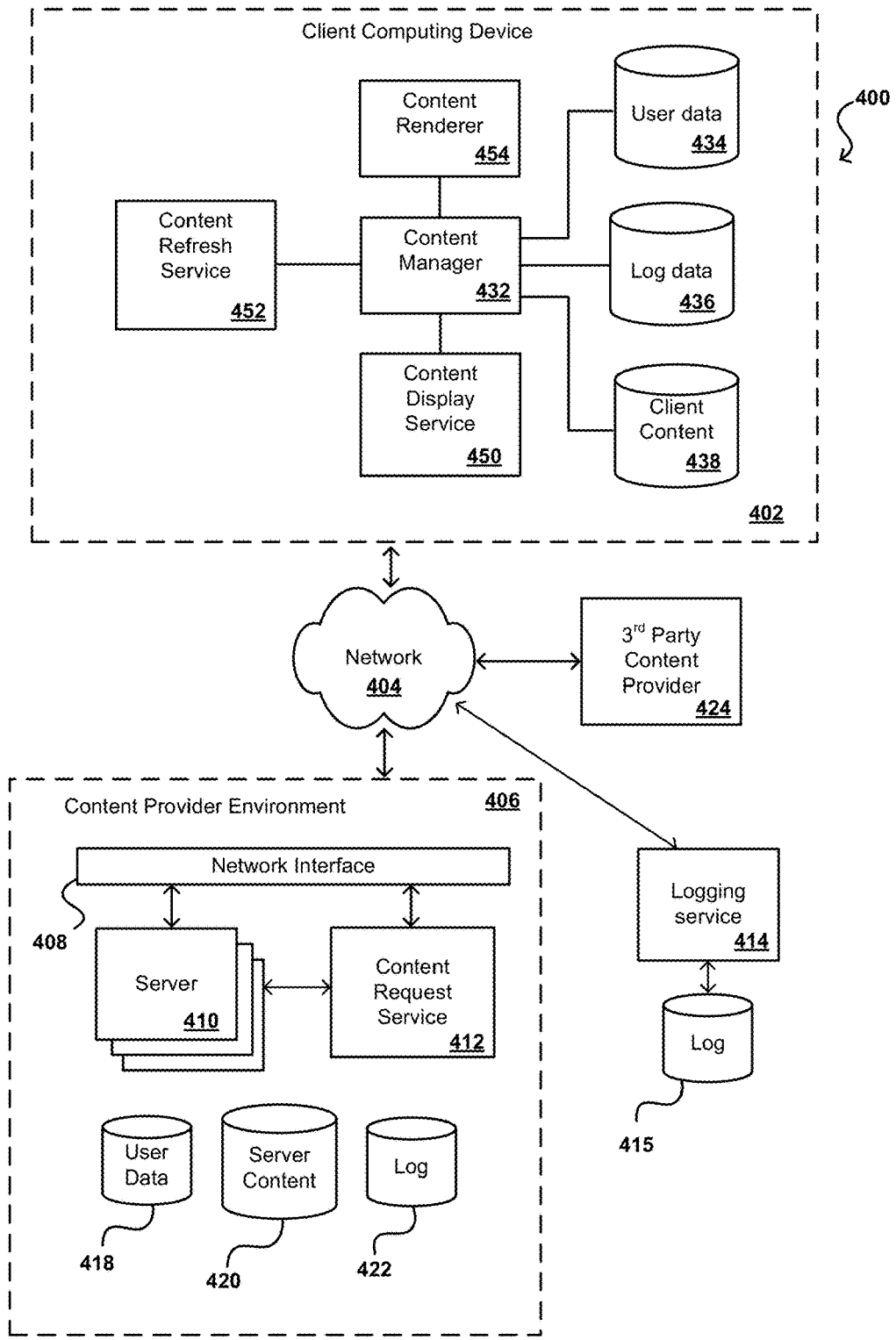
FIGS. 4A, 4B, and 4C illustrate example systems for displaying recommended content on a lock screen of a computing device in accordance with various embodiments.

FIG. 4A illustrates an example configuration of a system 400 for determining, displaying, and updating content data in accordance with various embodiments. As described, an example of content data includes recommend content. In this example, a client computing device 402 (e.g., similar to computing device 108 in FIG. 1A) is able to receive recommended content across at least one network 404 from an appropriate content provider environment 406. The client computing device 402 can generally include a content manager 432, a content renderer 454, a content display service 450, a content refresh service 452, user data store 434, log data store 436, and client content data store 438. In certain embodiments, the client can include a security component to detect and combat programmatic circumvention of determining, displaying, and updating the recommended content. For example, the security component listens to various system events and infers circumvention based on the sequence of received events. A countermeasure phases includes two stages: a preventive stage and a reactive stage. The preventive stage can be triggered when the screen is in a powered off state (i.e., not displaying content). The reactive stage can be triggered when the display screen is displaying content, and when the preventative state is detected when the screen is off. In the preventative stage, when the display screen is not displaying content, the security component triggers a method call (e.g., PhoneStatusBar.showKeyguard( ) to show the security key guard. This allows recommended content to show up on top of third party lock screens executing software to stop the client computing device from entering a sleep or lower power mode. In the reactive state, if circumvention is detected, the security component triggers a method call (e.g., PhoneStatusBar.showKeyguard( ) to show the security keyguard when the display screen has a display. This is used to prevent third party lock screens that use certain methods calls that can alter flags indicating when the lock screen is locked, dismissed, etc.

The client content data store 438 can store a local copy of the recommended content, display instructions for displaying the recommended content, as well as other information. As described, the display instructions can be provided by a content provider environment 406 or other such environment and can be used to determine a display schedule by which to display and update the recommended content on the client computing device's lock screen. For example, the display instructions can instruct the client computing device to listen for any notifications to be displayed on the lock screen or other events, and based on the presence on any notifications, the time of day, user information, lock screen events, and any other appropriate information, the client device 402 can determine a template to display the recommended content on the lock screen and/or whether to update the recommended content to be inserted in the template. As described herein, the display instructions can be periodically and automatically updated. For example, the content provider environment can include a service (e.g., an update service) operable to generate updates to the display instructions and can propagated the updates to the client computing device 402, where when installed, can be used to determine a template to display the recommended content, display and/or update the recommended content, or perform some other function described herein.

The recommended content can include, for example, rich media content, advertisements, graphics, text, selectable elements, etc. The recommended content can be personalized based on user information associated with a user of the client computing device and can be formatted for optimal display on the client computing device, taking into consideration various specifications of the client computing device (e.g., screen size, screen resolution, etc.) The recommended content can be provided by a content provider of the content provider environment. In accordance with various embodiments, the recommended content can be provided to the content provider environment from a third party content provider 424 or other such entity.

The user data store 434 can include usage information pertaining to the client computing device 402 as may include application usage, client computing device settings (e.g., cellular network provider, etc.), as well as user information (e.g., user preferences, unlock log, etc.). The at least one network 404 can include any appropriate network, such as may include the Internet, an Intranet, a local area network (LAN), a cellular network, and the like.

The content manager 432 can be used for rendering and updating recommended content. For example, the content manager 432 can receive a refresh notification or other such event/instruction from the content refresh service 452. The refresh notification can be generated in response to detecting a particular lock screen event. In response to receiving the refresh notification, the content manager can cause the content renderer 454 to initiate a content rendering process to generate recommended content to be displayed using content display service 450. In accordance with various embodiments, whether a refresh notification is generated can be based on the occurrence of one or more lock screen events. As described, example lock screen events include swiping away a lock screen where no security pin is required to access a home screen or other user interface of the client computing device, changing a user's enrollment status in receiving recommended content from a content provider, updating a user profile with a content provider, swiping away a lock screen where a security pin is required to access a home screen or other user interface of the client computing device, dismissing a security lock guard (e.g., pin entry, biometric entry, etc.) and returning to a lock screen, displaying a notification pane, launching or dismissing a camera application over a lock screen, dismissing a non-full-screen template that includes recommended content, displaying a notification overflow window, dismissing a notification overflow window, receiving a notification when a full-screen template that includes recommended content is being displayed, dismissing all notifications displayed on top of a full-screen template that includes recommended content, launching a dialer application over the lock screen, dismissing a dialer application from the lock screen, launching a voice assist application over the lock screen, dismissing a voice assist from the lock screen, powering on a display screen, powering off a display screen, activating a security key guard, activating a phone dialer application, detecting a reboot intent of the client computing device, determining, while a display screen of a client computing device is in a powered off state (i.e., the display screen is not displaying content), that the client computing device transitions from a state where no notifications are visible to where at least one notification would be visible or the client computing device transitions from a state where notifications are visible to a state where no notifications are visible, among other such examples. The lock screen events can be generated in response to, for example, a user interaction with a display screen of the client computing device, pressing a physical button on a client computing device a predetermined number of times, contacting a graphical button on a client computing device a predetermined number of times, detecting a time out event, detecting predetermined movement of a client computing device, receiving an input from a different client computing device (e.g., a smart watch), receiving input from an object (e.g., a cover of a client computing device with a magnet that causes the display screen to power on/off), etc.

The content refresh service 452 can monitor for lock screen events and in the situation where a particular one of the lock screen events is detected, content refresh service 452 can notify the content manager 432 to initiate content selection, rendering, and display logic. For example, in the situation where the content refresh service 452 detects a power button (or other such button) being pressed to cause a display screen of the client computing device to enter a powered off state (i.e., the display screen is not displaying content), the content refresh service 452 can notify the content manager 432 of the lock screen event. The content manager 432 can notify the content renderer 454, which can initiate content selection logic to determine recommended content to be displayed by the content display service 450.

In another example, in the situation where the content refresh service 452 detects the power button (or other such button) being pressed a predetermined number of times to activate an application (e.g., a camera application, a voice assistant application, etc.), the content refresh service 452 can notify the content manager 432 of the lock screen event. The content manager 432 can notify the content renderer 454, which can initiate content selection logic to determine recommended content to be displayed by the content display service 450. The content renderer 454 can execute content selection logic for recommended content to be displayed in a full-screen template (recommended content for non-full-screen templates remain unchanged). As such, recommended content to be displayed in a full-screen template is cleared while recommended content to be displayed in a non-full-screen template remains the same. The cleared recommended content can be temporarily stored or otherwise persisted to cache or another memory component such as client content data store 438. The content renderer 454 can then initiate content render logic. In the situation where the render logic does not complete before the display screen is in a powered on state, the content display service 450 retrieves the cached recommended content and displays the cached recommended content by inserting the cached recommended content in the full-screen template. In the situation where the content render logic completes before the display screen is in a powered on state, the content display service 450 displays updated recommended content by inserting the updated recommended content in the full-screen template.

In yet another example, in the situation where the content refresh service 452 detects a reboot of the client computing device, the content refresh service 452 can notify the content manager 432 of the reboot (i.e., the lock screen event.) The content manager 432 can notify the content renderer 454, which can initiate content selection logic to determine recommended content to display and can cache the determined recommended content for use when the client computing device reboots. During a boot process, when it is determined that at least a predetermined portion of components of the client computing device are executing, the appropriate software is loaded, and that the display screen is in a powered off state (i.e., the display screen is not displaying content), the content renderer 454 can cause the content display service 450 to display the recommended content on the lock screen when the display screen is in a powered on state.

In yet another example, in the situation where the content refresh service 452 detects that the display screen is in a powered off state and the client computing device transitions from a lock screen state where no notifications are visible to a lock screen state where at least one notification would be visible, or the display screen is in a powered off state and the client computing device transitions from a state where at least one notification would be visible to a state where no notifications would be visible, the content refresh service 452 can notify the content manager 432 of the lock screen event. The content manager 432 can notify the content renderer 454, which can initiate content selection logic to determine recommended content to be displayed by the content display service 450. For example, in the situation where the client computing device transitions from a state where at least one notification would be visible to a state where no notifications will be visible, content selection for recommended content to be displayed in a full-screen template is initiated. In this example, the content renderer 454 can initiate selection and render logic. In the situation where the render logic does not complete before the display screen is in a powered on state, the content display service 450 retrieves previously cached recommended content used in a full-screen template and displays the cached recommended content on the lock screen in the full-screen template. In the situation where the render logic completes before the display screen is in a powered on state, the content display service 450 enables for display updated recommended content. In the situation where the client computing device transitions from a lock screen state where zero notifications will be visible to a state where at least one notification is to be visible, content selection for recommended content to be displayed in a non-full-screen template is initiated. For example, the content renderer 454 initiates content selection and render logic. In the situation where the render logic does not complete before the display screen is in a powered on state, the content display service 450 attempts to render the recommended content in a non-full-screen template while the display screen is in the powered on state.

In accordance with various embodiments, other lock screen events can be determined and based on these determined lock screen events a determination can be made whether to update and/or display recommended content. For example, when returning from an application launched over the lock screen, the client computing device can delete recommended content displayed in a full-screen template and continue to display recommended content displayed in a non-full-screen template. In another example, when a security key guard or other such security interface requiring an input to access the home screen of the client computing device is dismissed, recommended content is deleted. In another example, when the display screen is caused to be in a powered off state, content selection logic, content rendering logic, and content display logic can be executed and updated recommended content can be provided for display the next time the display screen is powered on. In various embodiments, powering off the display screen and/or computing device triggers the content selection logic and content rendering logic.

In accordance with certain embodiments, recommended content may not be updated when the display screen is in a powered on state. This can include situations where the lock screen is visible and/or the user is in a full-screen application and a notification is received. In this example, any recommended content currently being displayed may not be updated at that time. Rather, content selection and rendering logic can be executed when the display screen is in a powered off state. As described above, a possible exception to this situation is where a home button or other such button is pressed a predetermined number of times. In this example, recommended content in a full-screen template is updated.

In accordance with various embodiments, as relating to retrieving recommended content and/or display instructions, a request can be received to a network interface layer 408 of the content provider environment 406 for the recommended content and/or the display instructions. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request from the client computing device 402, and cause at least a portion of the information in the request to be directed to an appropriate system or service, such as a server 410 (e.g., a Web server or application server), among other such options. At least one server 410 might be used to generate the display instructions and send the recommended content for rendering on the lock screen. To generate the display instructions and the recommended content, the servers or other components of the environment might access one or more data stores, such as a user data store 418 that contains information about the various users, and one or more server content data stores 420 storing recommended content able to be served to those users. The user data store 418 can include, for example, purchase history; customer behavior such as application or service usage; user responsiveness to advertisements such as clickthrough rate; social media information; service and/or displayed advertisements; and/or any other information that can be used to indicate user preference to a type of advertisement and/or recommended content.

A content request service 412 can be configured to provide information to include in the recommended content, and can include certain parameters regarding presenting recommended content. For instance, the content request service 412 can specify rules that affect a frequency at which the recommended content is displayed, the types of notifications the recommended content is displayed with, lock screen events that trigger an update of recommended content, etc. Once the appropriate components of the content provider environment 406 have determined the appropriate information, a response can be returned to the client computing device 402 over the network. This can include any recommended content and the display instructions for determining, rendering, and updating the recommended content.

In various embodiments, the third party content provider 424 can be, a social media network, news network, an ad network (e.g., a company that connects advertisers to publishers, such as websites or application developers, that host ads), an ad mediator (e.g., an ad tracking platform that enables the allocation of advertising inventory across multiple ad networks), an ad exchange (e.g., a technology platform that facilitates automated auction-based pricing and buying in real-time between advertiser demand and publisher ad supply), or the like. The third party content provider 424 can include or at least be in communication with an advertising manager, the content request service, or other appropriate service, which can include any combination of devices and/or processes operable to encompass, monitor, and/or control a number of different algorithms and components for selecting recommended content. In accordance with an embodiment, the recommended content can be provided to the content provider environment from the third party content provider 424, and the content provider environment can provide the recommended content to the client computing device. For example, the content renderer, or other component on the client computing device 402 can submit a request for recommended content. The request can be received by the content provider and the content provider can submit a request for the appropriate content to the third party content provider. The request from the content provider to the third party content provider can include any appropriate information for determining, recommended content. For example, the information can include usage profile and user information (such as demographic information), log information for a frequency of displayed recommended content, the placement of displayed recommended content, and/or the appearance of displayed recommended content, among other information.

In accordance with an embodiment, when the recommended content is loaded on the lock screen, the display instructions executing on the client computing device 402 can analyze the properties of the recommended content displayed to determine whether the user has viewed or otherwise interacted with the recommended content. The user interaction with the recommended content (e.g., selecting the recommended content), the downloaded advertisements, the advertisements view, the template used to display the recommended content (e.g., full screen template, notification template, and banner template), and other information can be stored in log data store 436. The information can be provided to the content provider environment, third party content provider, a logging service, or some other entity.

For example, the client computing device 402 can then cause at least one call or request to be submitted to a least one logging service 414, within or outside the provider environment 406, where the call or request can include information about the visibility of the advertising, interaction metrics (e.g., a time of day, template to display the recommended content, etc.), among other such options. The information can then be stored to log database 415 or similar location for subsequent analysis. In some cases, the information in the log database 415 will periodically be pulled and transformed to a format that can be stored to a table in the user data store 418, or other data repository or log data store 422, for reporting or statistical analysis with other data, enabling various types of reporting and analysis to be performed across various types of data.

Figure 4B:
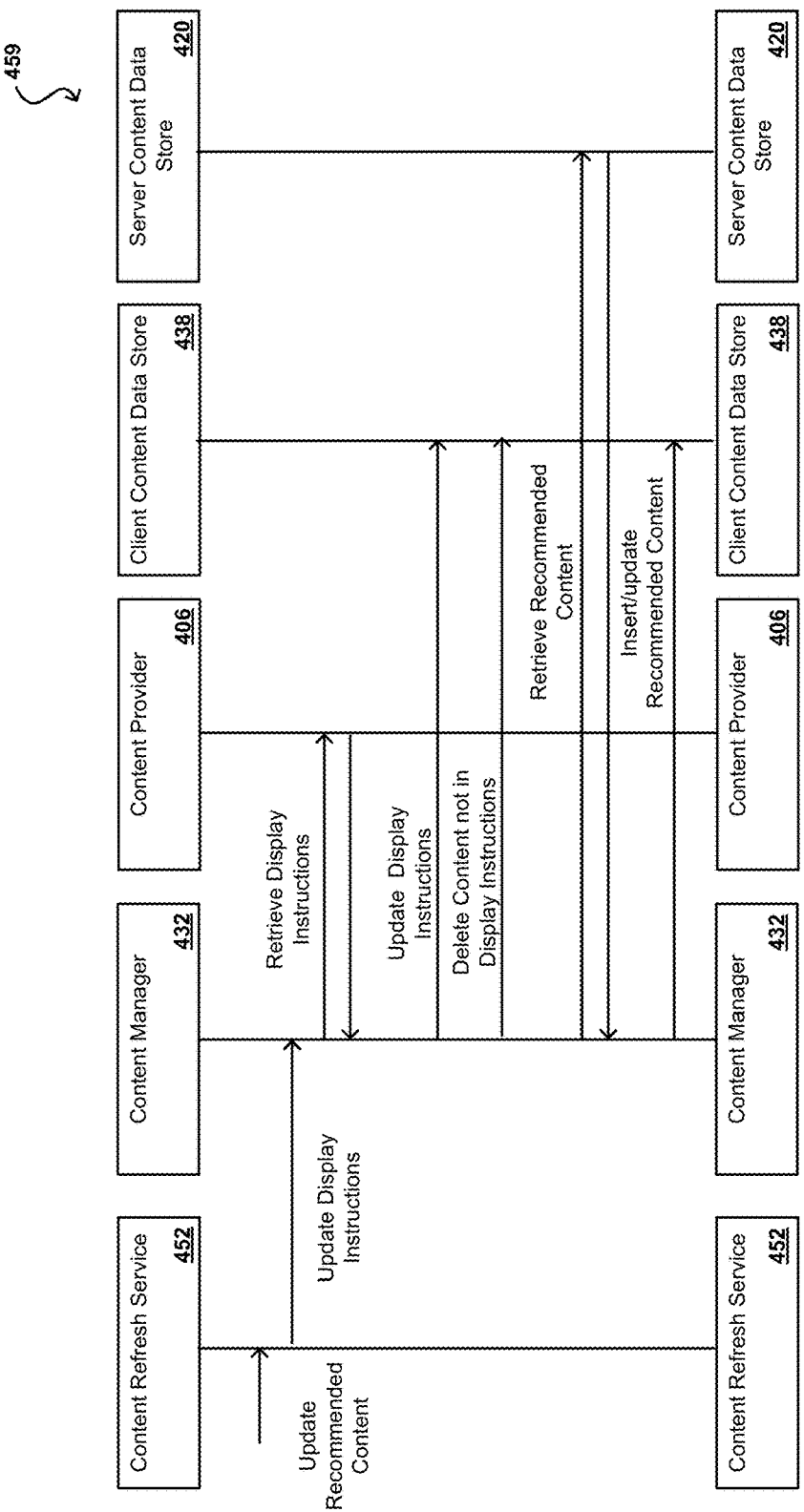

FIG. 4B illustrates an example system 459 for obtaining recommended content for use in accordance with various embodiments. In this example, a content refresh service 452 operating on a client computing device (e.g., client computing device 402) detects an event to retrieve display instructions and recommended content to be displayed on the client computing device. Instructions to update recommended content can be received at the content refresh service in response to, for example, the client computing device connecting to the internet, after a predetermined period of time elapses from a previous time display instructions and/or recommended content is retrieved, after a predetermined event occurs (e.g., the client computing device is powered on), or some other event. The display instructions can include a manifest or other information specifying recommended content to retrieve, display instructions, and any other information used to determine, display, and/or update the recommended content stored on the client computing device. Once the instruction to "update recommend content" is received at the content refresh service 452, the content refresh service 452 can instruct the content manager 432 to "update display instructions." This can include, for example, the content manager communicating a request to "retrieve display instructions" to the content provider 406, where the content provider can provide the display instructions to the content manager 432 over at least one network. Additionally or alternatively, the content manager 432 can communicate with the content provider 406 to request information associated for the display of recommended content from previous display instructions as well as any other information. Once the content manager 432 receives the display instructions, the content manager 432 can use the retrieved display instructions to update or replace previous display instructions stored in client content data store 438. This can include, for example, deleting recommended content and/or other data from client content data store 438 specified in the display instructions. Once the recommended content and other data is removed from the client content data store 438, the content manager 432 can request recommended content specified in the display instructions that is not stored in the client content data store 438 from server content data store 420. As described, server content data store 420 is associated with content provider 406. Thereafter, content manager 432 can update client content data store 438 with the recommended content obtained from server content data store 420.

Figure 4C:
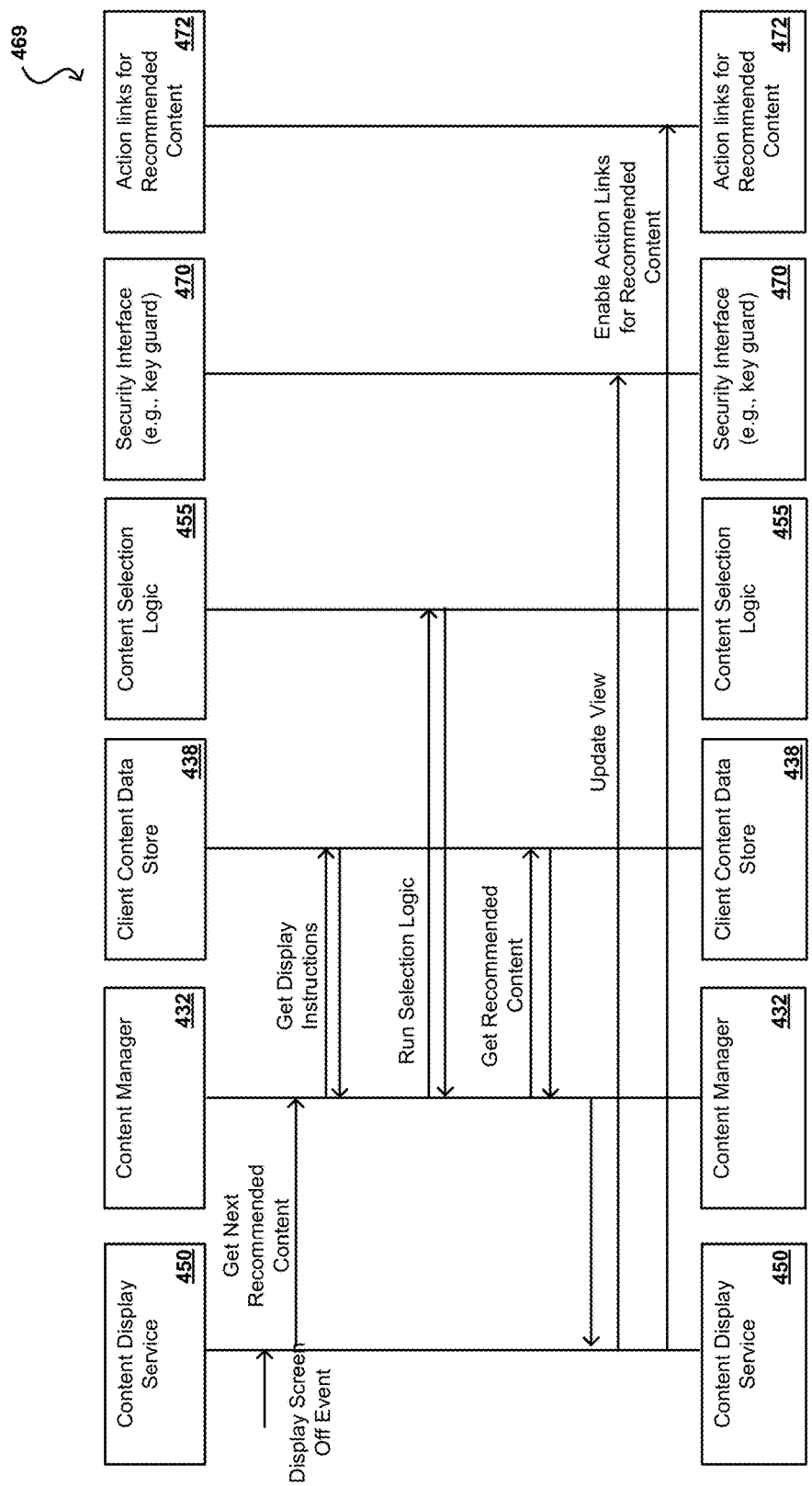

FIG. 4C illustrates an example system 469 to provide for display recommended content in accordance with various embodiments. A lock screen event is detected. In this example, the lock screen event corresponds to a display screen of the client computing device transitioning to a powered off state. The lock screen event is detected by the content display service 450. For example, in accordance with various embodiments, the content display service can monitor for particular lock screen events and an indication of the occurrence of the lock screen event can be communicated to the content display service 450. The content display service 450 sends a request to "get recommended content" to the content manager 432. The content manager 432 can obtain or otherwise access display instructions from client content data store 438. Once the display instructions are obtained and/or otherwise accessed, the content manager 432 can initiate content selection logic 455. The content selection logic can select the appropriate recommended content. As described, the content selection logic can be a java script file or other software that can be used to select recommended content in accordance with the various embodiments described herein. In this example, the content selection logic 455 can select the recommended content and can instruct content manager 432 to retrieve the selected recommended content from client content data store 438. The retrieved recommended content can be provided to content display service 450. This can include providing instructions to content display service 450 on which recommended content to display and under what conditions respective recommended content is to be displayed. Thereafter, the content display service 450 can enable the recommended content for display. For example, the content display service can instruct an interface 470 (e.g., a security interface or other such interface) to display the recommended content in one of a full-screen template or a non-full-screen template on a lock screen in response to a lock screen event, such as powering on the display screen. The content display service can enable action links 472 or other user-selectable elements associated with the recommended content. The action links, when selected, can cause the computing device to perform an action such as launch an application, provide additional content displays, provide information associated with the recommended content, etc.

Figure 5A:
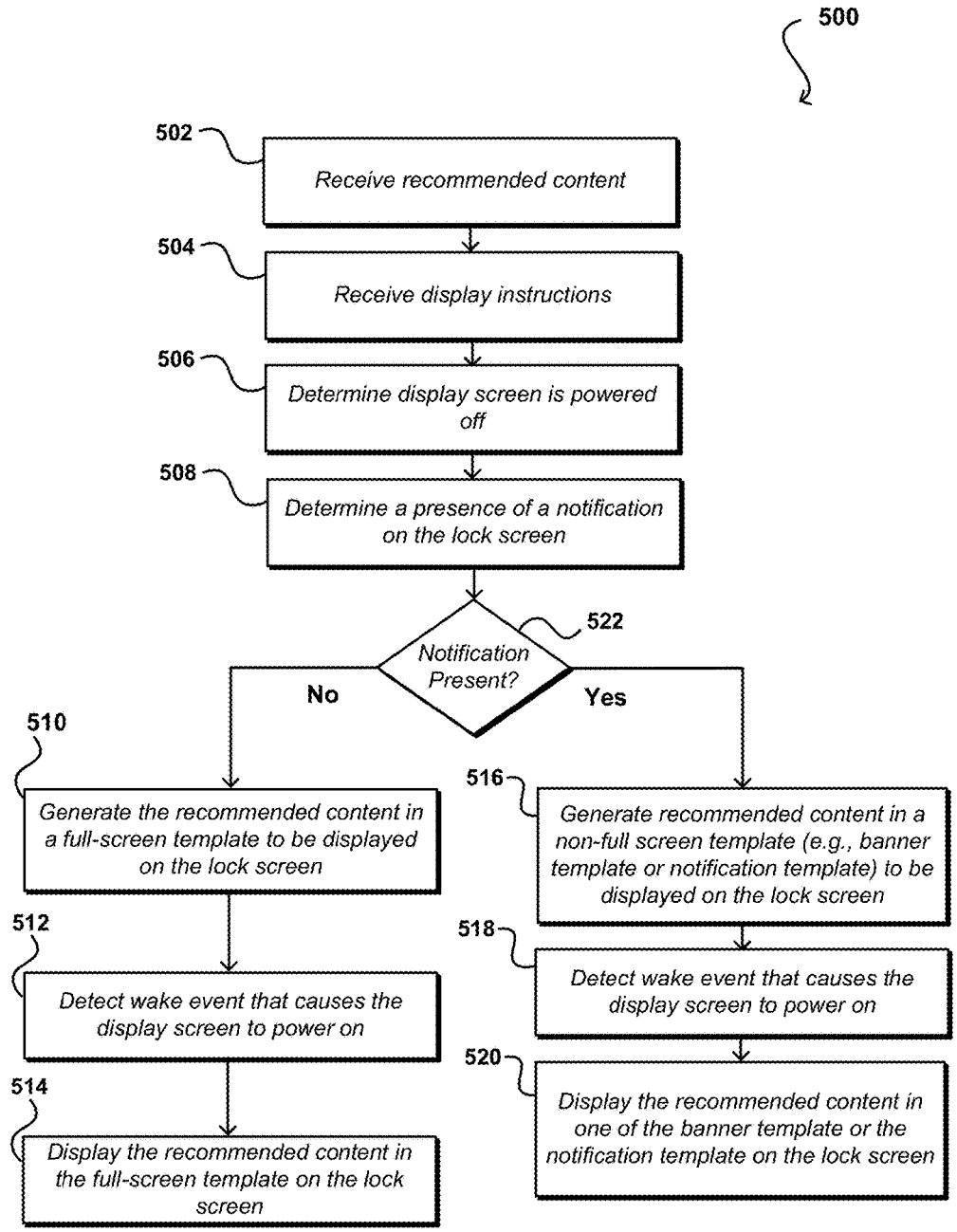
FIGS. 5A, 5B, and 5C illustrate an example process for displaying and updating recommended content on a lock screen of a computing device in accordance with various embodiments.

FIG. 5A illustrates an example process 500 for displaying content data on a lock screen of a computing device in accordance with various embodiments. It should be understood that, for any process described herein, that there can be additional or fewer steps performed in similar or alternative orders, or in parallel, within the scope of the various embodiments unless otherwise stated. In this example, a component operating on a computing device or other software code or application, can be used to determine content data that includes advertisements, user selectable elements, display information, and/or other content to display with a lock screen of a computing device. As described, an example of content data includes recommend content, which can be provided by a content provider or other such entity. In this example, the content provider is associated with a cloud-based recommendation service that generates recommended content based at least in part on a customer profile associated with the computing device. The customer profile can be associated with at least one of customer preferences, customer purchase history, customer search history, customer media consumption history, geographic location of the computing device, customer physical activity data, limited time discounts provided by the first content provider, customer wish list with the first content provider.

In this example, recommended content is received 502 for display on a lock screen of a computing device. The recommended content can include, for example, rich media content, advertisements, and other content a user or other object can interact with. The recommended content as well as any advertisements and/or other information (e.g., advertisement images, advertisement description, etc.) can be stored on the computing device. Display instructions can be received 504. The display instructions can be used by the computing device to determine a template to display the recommended content and a display schedule by which the recommended content is to be displayed. For example, the display instructions can be used to cause the computing device to display recommended content at specific times, under specific conditions, and/or in response to particular event (e.g., lock screen events). As described herein, a content provider or other entity can provide such recommended content, advertisement and/or other information, display instructions to the computing device.

The display screen of the computing device is determined at 506 to be in a powered off state. In a powered off state, the lock screen cannot be accessed until the display screen is powered on. As described, a lock screen is a type of graphical user interface (GUI) that is displayed on a display screen when the display screen is "locked," or programmed not to respond to most touches on the display screen. The lock screen can be displayed upon detecting an input that "wakes" the display screen. An example input can be a selection of a physical button, a voice input, movement of the computing device, system notifications being displayed by the computing device, etc. Upon waking the device, the display screen is powered on and the lock screen is displayed. The presence of a notification to be displayed on the lock screen is determined 508. While the display screen is off, the determination can be repeated at a predetermined interval and for each interval the presence of a notification to be displayed can be determined. For example, in certain situations, a notification might be displayed on the display screen for a first interval but for a second interval (or some other interval) the notification might have been cleared by the computing device. In this example, for the first interval, the recommended content can be generated in a full-screen template. However, once the notification was cleared and now that there are no notifications to be displayed on the lock screen, the recommended content can be generated in one of a banner template or a notification template on the lock screen. Example notifications include missed text message notifications, missed call notifications, calendar event notifications, operating system notifications, network notifications, among others. In the situation where zero notifications are determined to be displayed on the lock screen, the recommended content can be generated 510 by inserting the recommended content into a full-screen template for display on the lock screen. In response to detecting 512 a wake event that causes the display screen to power on, the recommended content is displayed 514 in the full-screen template on the lock screen. In the situation where at least one notification is determined to be displayed on the lock screen, then the recommended content is generated 516 in a non-full-screen template (e.g., one of a banner template or a notification template) by inserting the recommended content into the non-full-screen template. Whether the banner template or the notification template is used can be based on, for example, the number of notifications to be displayed on the display screen. For example, in the situation where there are a few notifications being displayed (e.g., three or less), the recommended content can be generated in a banner template. In the situation where three or more notifications are being displayed on the lock screen, the recommended content can be generated in a notification template. In the situation where ten or more notifications are being displayed, no recommendations may be displayed. Other factors can include the time of day, the number of lock screens per day, computing device usage information, etc. In response to detecting 518 a wake event that causes the display screen to power on, the recommended content is displayed 520 in one of the non-full-screen template (e.g., the banner template or the notification template.) As described, a user can interact with the recommended content. For example, the user can tap, select, swipe, or otherwise interact with the recommended content in a same or similar manner as with other notifications. Selecting the recommended notification can cause the computing device to display additional information, launch an application, or some other action associated with the recommended content.

Figure 5B:
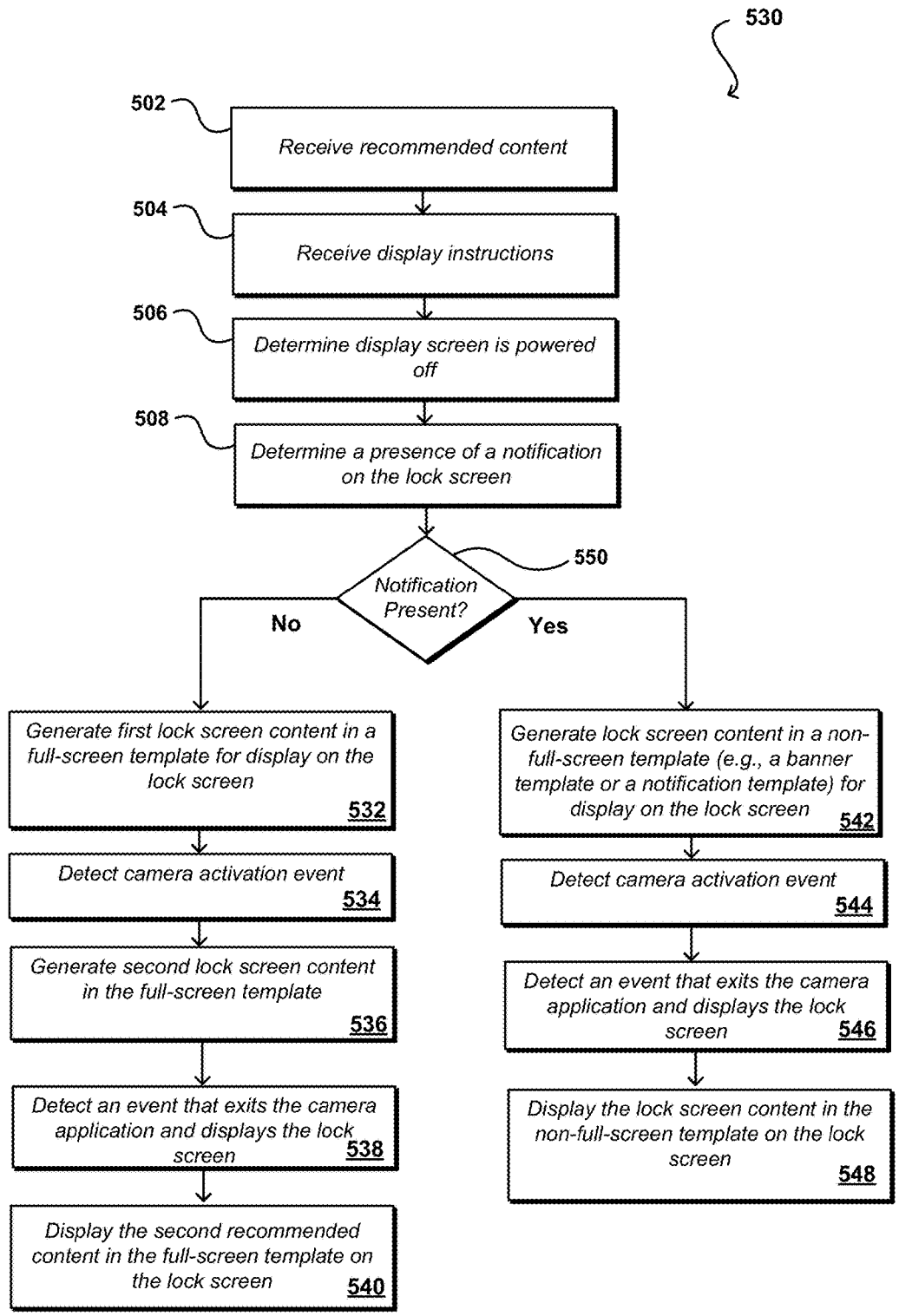

FIG. 5B illustrates an example process 530 for updating recommended content on the lock screen of the computing device in accordance with various embodiments. In this example, the component operating on the computing device or other software code or application, can be used to update recommended content (e.g., advertisements, user selectable elements, display information, etc.) for display in response to a lock screen event. As described in FIG. 5A, recommended content for display on the lock screen of the computing device is received 502. Display instructions and other information can also be received 504. As described, the display instructions can be used to determine a template (e.g., full-screen template or non-full-screen template) to display the recommended content and a display schedule by which the recommended content is to be displayed and updated. For example, display instructions can be used to cause the computing device to display and/or update the recommended content at specific times, under specific conditions, and/or in response to a specific event. In this example, the display screen of the computing device is determined 506 to be in a powered off state. Once the display screen is determined to be in a powered off state, the presence of a notification to be displayed on the lock screen is determined 508. In the situation where zero notifications are determined to be displayed on the lock screen, first lock screen content can be generated 532 by inserting first recommended content into a full-screen template for display on the lock screen. A lock screen event can be detected. In this example, detecting the lock screen event corresponds to detecting 534 a camera activation event that activates a camera application in response to a power button (or other such button) being pressed a predetermined number of times. Once the camera application is active, second lock screen content can be generated 536 by inserting second recommended content into the full-screen template, where the second recommended content can be different from the first recommended content. In response to detecting 538 an event that exits the camera application and displays the lock screen, the second recommended content can be displayed 540 in the full-screen template on the lock screen. For example, an input such as pressing a home button or other such button can exit the camera application and display the lock screen. In the situation where at least one notification is determined to be displayed on the lock screen, lock screen content can be generated 542 by inserting the first recommended content in a non-full-screen template (e.g., one of a banner template or a notification template). A camera activation event can be detected 544 by detecting a power button (or other such button) being pressed the predetermined number of times. In response to detecting 546 an event that exits the camera application and displays the lock screen, the lock screen content can be displayed 548 by inserting the first recommended content in the non-full-screen template (e.g., the banner template or the notification template.)

Figure 5C:
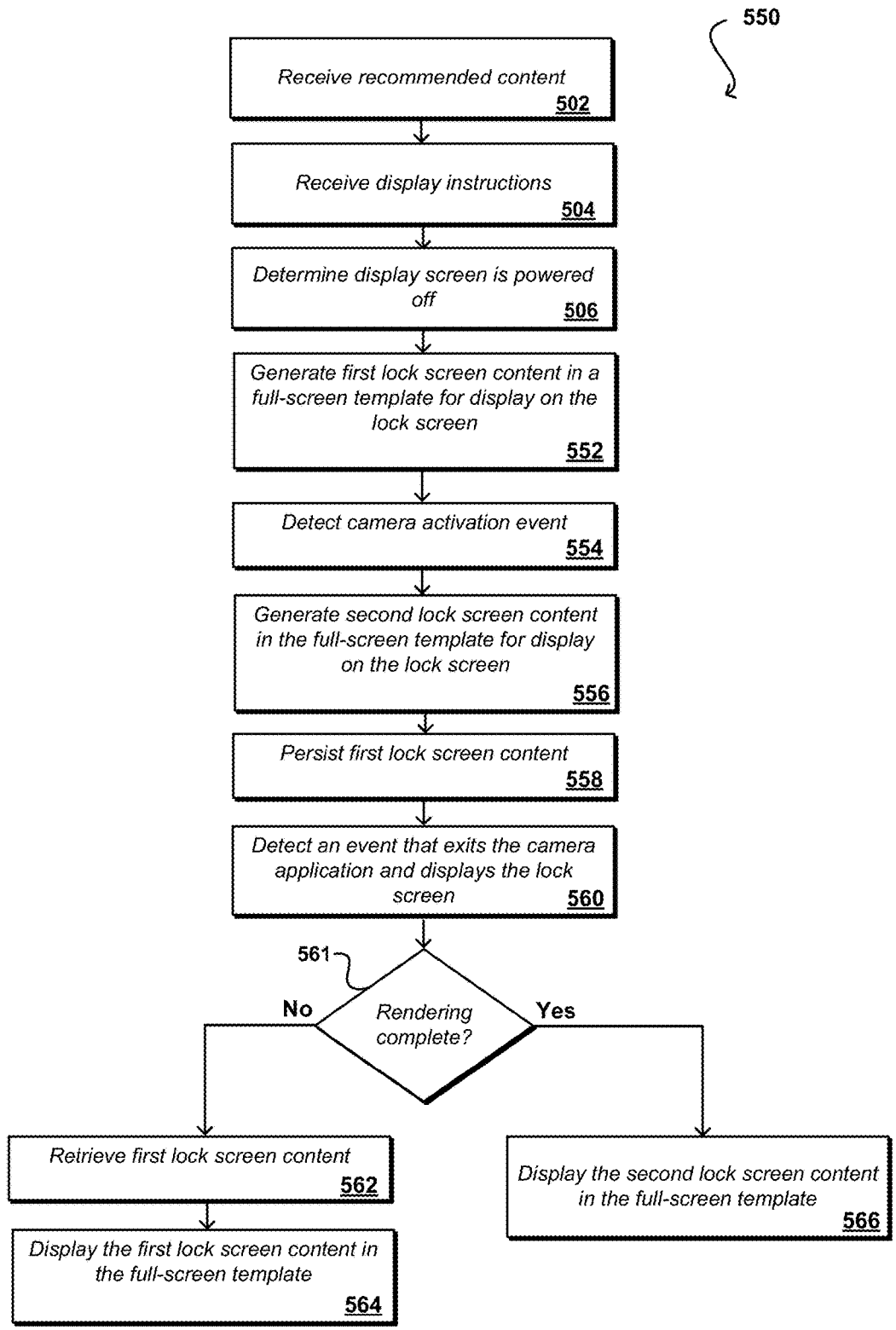

FIG. 5C illustrates an example process 550 for updating recommended content on the lock screen of the computing device in accordance with various embodiments. As described, the component operating on the computing device or other software code or application, can be used to update recommended content that includes advertisements, user selectable elements, and/or other content to display on the lock screen of the computing device. As described in FIGS. 5A and 5B, recommended content is obtained 502 for display on the lock screen of the computing device. Display instructions and other information can also be received 504. In this example, the display screen of the computing device is determined 506 to be in a powered off state. Once the display screen is determined to be in a powered off state, first lock screen content can be generated 552 for display on the lock screen by inserting first recommended content into a full-screen template. A lock screen event can be detected. In this example, detecting the lock screen event corresponds to detecting 554 a camera activation event that activates a camera application in response to a power button (or other such button) being pressed a predetermined number of times. Once the camera application is active, second lock screen content can be generated 556 for display on the lock screen by inserting second recommended content into the full-screen template. The first lock screen content can be persisted 558 to a client content data store (e.g., client content data store 338). An event that exits the camera application and displays the lock screen can be detected 560. In response to displaying the lock screen, a determination 561 can be made whether the second recommended content has completed rendering in the full-screen template. In the situation where the second recommended content has not completed rendering in the full-screen template, the first lock screen content is retrieved 562 from the client data store and displayed 564 in the full-screen template on the lock screen. In the situation where the second recommended content has completed rendering in the full-screen template, the second lock screen content can be displayed 566 in the full-screen template on the lock screen.

Figure 6A:
FIGS. 6A, 6B, 6C, and 6D illustrate a second example approach to displaying content on a display screen of a computing device in accordance with various embodiments.

In some situations the displayed content might not automatically change from the lock screen as a result of an authentication action or other unlock event. In the example 600 of FIG. 6A, recommended content 602 is displayed on a lock screen along with the fingerprint icon 604 indicating that the device is in a locked state and able to be unlocked using a fingerprint scanner. For other types of biometric data there can be other types of icons displayed as well, such as an eye icon for a retinal scanner, a face icon for a facial recognition system, a microphone icon for a voice recognition algorithm, and the like. Further, at least some devices will allow for unlocking to be performed using one or more other approaches as well, such as by swiping across a touch sensitive display and entering a password or personal identification number (PIN), among other such options. Once an identity of the user has been authenticated, through data captured by the fingerprint scanner or otherwise, a determination can be made as to whether any promotional, advertising, or other supplemental content should be provided for display on the lock screen after the authentication, and whether there is a desired amount of time for which that content is to be displayed after the verified unlock action. In some embodiments, advertising content 602 is to be displayed for a minimum amount of time on the lock screen after the device is unlocked, such as for at least three or five seconds, unless another user action is take or another relevant occurrence detected. The advertiser may have paid an amount for the advertising based on this minimum amount of time.

Figure 6B:
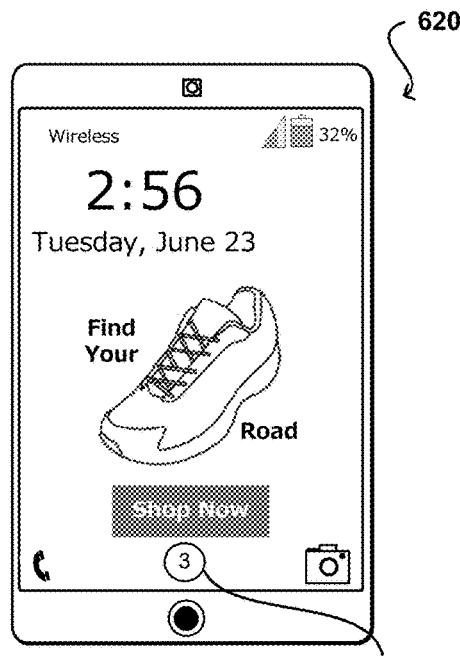
Figure 6C:
Figure 6D:
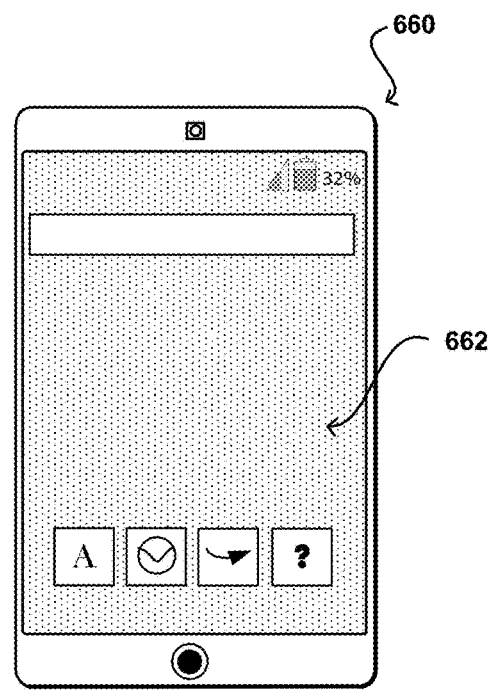

In the example 620 of FIG. 6B the lock screen continues to be displayed for three seconds after authentication before a different screen is displayed. In order to inform a user as to the reason that the lock screen is still displayed, and to provide information about the remaining time for the lock screen to be displayed after a successful unlocking of the device, a countdown icon 622, graphical timer, or other such element can be displayed that can indicate the amount of time remaining for the lock screen to be displayed. For situations where the advertising content 602 is to be displayed for at least a minimum amount of time, the countdown icon 622 can indicate the number of seconds left before the minimum time is reached. Various other timing approaches and values can be used as well within the scope of the various embodiments. As mentioned, a countdown icon 622 can be displayed with the number of seconds decreasing monotonically until the specified or minimum amount of time has passed, after which the lock screen may no longer be displayed and the device can display another interface, screen, or page, such as a home screen 662 as illustrated in the example 660 of FIG. 6D. In at least some embodiments the user can provide input during the countdown in order to dismiss the lock screen with advertising 602 and/or access the functionality of the device. For example, since the user has already successfully been validated and caused the device to be unlocked, the user can provide a swipe, button press, or other such input in order to cause the lock screen to no longer be displayed. Various other types of actions or inputs can be used to dismiss the lock screen as well within the scope of the various embodiments.

In some embodiments, however, the lock screen might not go away automatically at the end of the countdown. For example, in the example display 640 of FIG. 6C, the countdown timer reached zero seconds left, and at that time is replaced with an unlock icon 642 or other such graphical element. This can indicate to a user that the device is unlocked and ready to use, but requires at least one additional input or action on behalf of the use (or another such source). Another action might be required in order to ensure that the user has sufficient time to read the notifications, advertising, or other content displayed on the lock screen. For example, there might be several notifications or a video advertisement on the lock screen in which the user has interest, and automatically switching away from this content after three seconds might be undesirable from a user standpoint. Thus, instead of automatically dismissing the lock screen an unlock icon 642 might be displayed indicating that the user can dismiss the lock screen when ready. In some embodiments the action to take can be determined dynamically, such as may be based on the type and/or amount of content displayed on the lock screen. In some embodiments the amount of time might instead be extended, such as to at least provide sufficient time for the entire video advertisement to play, or to enable reading of the number of notifications displayed. The user can still always have the option of dismissing the lock screen for an unlocked device in at least some embodiments, and in some embodiments can take an action such as to select a displayed notification or advertisement which can cause the device to display content relevant to the selection rather than the lock screen or a home screen, etc. The unlocked icon can indicate to the user that the user is to take another action to dismiss the lock screen, such as to press a button, swipe across a touch-sensitive display, perform a gesture, speak a command, or otherwise perform an action to cause the displayed content to change from the lock screen to a home screen 662, or other display of content, as illustrated in the example 660 of FIG. 6D.

Figure 7:
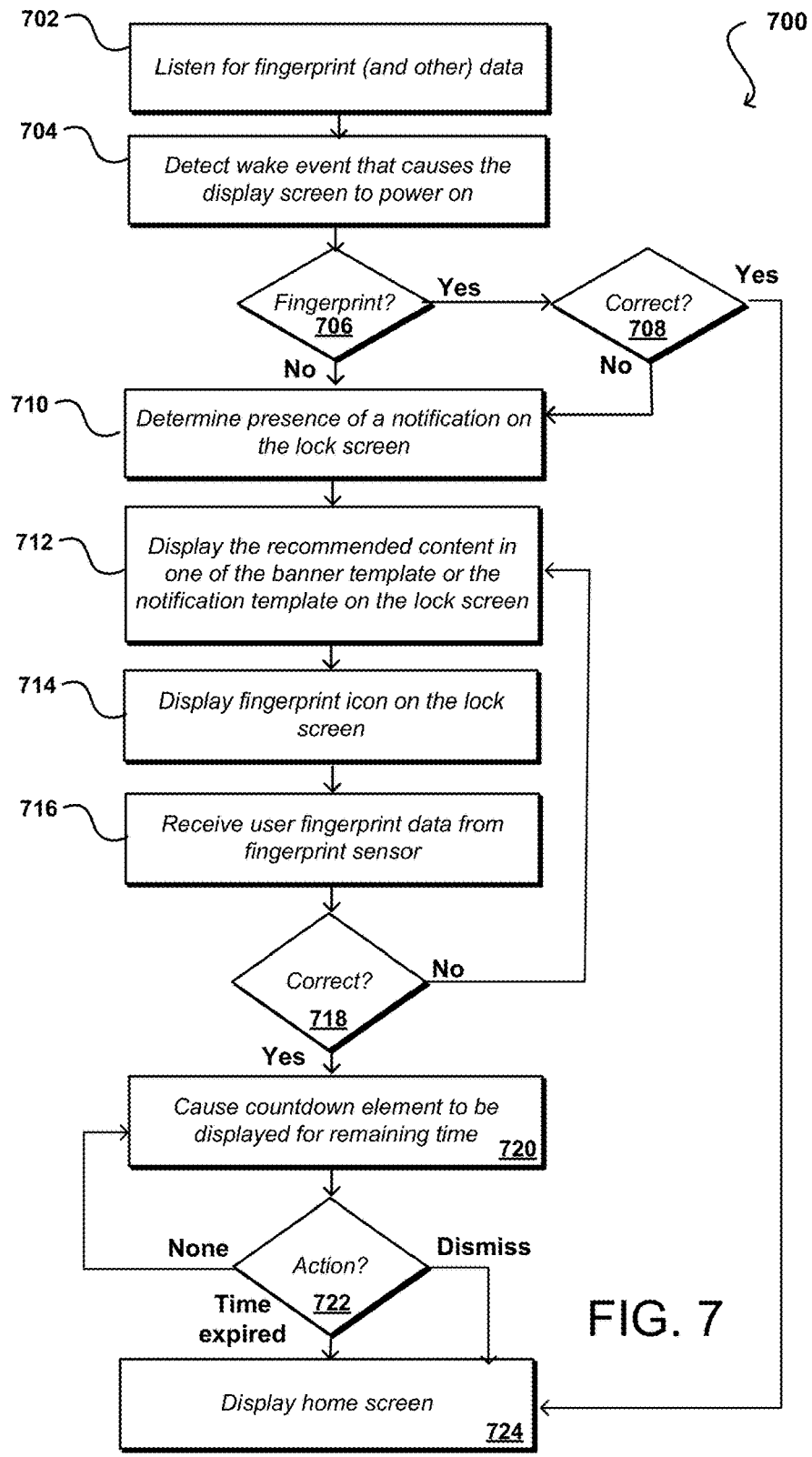
FIG. 7 illustrates a first example process for displaying recommended content on a lock screen of a computing device that is able to be unlocked using a fingerprint scanner in accordance with various embodiments.

FIG. 7. Illustrates an example process 700 for displaying content for a locked device that can be utilized in accordance with various embodiments. In this example, a component operating on a computing device, or other software code or application, can be used to determine content data that includes advertisements, user selectable elements, display information, and/or other content to display with a lock screen of a computing device. As described, an example of content data includes recommend content, which can be provided by a content provider or other such entity. In this example, the content provider is associated with a cloud-based recommendation service that generates recommended content based at least in part on a customer profile associated with the computing device. The customer profile can be associated with at least one of customer preferences, customer purchase history, customer search history, customer media consumption history, geographic location of the computing device, customer physical activity data, limited time discounts provided by the first content provider, customer wish list with the first content provider. In this example, recommended content is determined for display on a lock screen of a computing device. The recommended content can include, for example, rich media content, advertisements, and other content a user or other object can interact with. The recommended content as well as any advertisements and/or other information (e.g., advertisement images, advertisement description, etc.) can be stored on the computing device. Display instructions can be received and used by the computing device to determine a template to display the recommended content and a display schedule by which the recommended content is to be displayed.

The display screen of the computing device is determined to be in a powered off state. In a powered off state, the lock screen cannot be accessed until the display screen is powered on. As described, a lock screen is a type of graphical user interface (GUI) that is displayed on a display screen when the display screen is "locked," or programmed not to respond to most touches on the display screen. While the device is in a locked state, the device can be configured to "actively listen" 702 for one or more inputs, such as fingerprint input. As discussed elsewhere herein, a fingerprint scan can be used in some embodiments to both wake the device and authenticate to the device via a single user input. While the device is locked, a wake event can be detected 704 that causes the display screen to power on. As mentioned, there can be a number of different actions that can trigger a wake event, such as a button being pressed, touch-sensitive screen being swiped or pressed, device being moved, motion being detected, etc. A determination can be made 706 as to whether the wake event corresponded to a fingerprint scan. If so another determination can be made 708 as to whether the fingerprint data obtained from the scan is sufficient to unlock the device. As discussed elsewhere herein, this can include determining that the fingerprint data corresponds to an authorized user of the device, among other such options. If the fingerprint data is correct, the device can be unlocked and the home screen (or other content) displayed. If the wake event does not correspond to fingerprint data, or if provided fingerprint input is insufficient to unlock the device, then the device can be awakened up not unlocked in at least some embodiments.

Upon waking the device, the display screen is powered on and the lock screen is displayed. The presence of a notification to be displayed on the lock screen is determined 710. While the display screen is off, the determination can be repeated at a predetermined interval and for each interval the presence of a notification to be displayed can be determined. For example, in certain situations, a notification might be displayed on the display screen for a first interval but for a second interval (or some other interval) the notification might have been cleared by the computing device. In this example, for the first interval, the recommended content can be generated in a full-screen template. However, once the notification is cleared and there are no notifications to be displayed on the lock screen, the recommended content can be generated in one of a banner template or a notification template on the lock screen. Example notifications include missed text message notifications, missed call notifications, calendar event notifications, operating system notifications, and network notifications, among others. In the situation where zero notifications are determined to be displayed on the lock screen, the recommended content can be generated by inserting the recommended content into a full-screen template for display on the lock screen. In response to detecting a wake event that causes the display screen to power on, the recommended content is displayed 712 in the template on the lock screen. Whether a banner template, notification template, or other template is used can be based on, for example, the number of notifications to be displayed on the display screen as discussed elsewhere herein. As described, a user can interact with the recommended content. For example, the user can tap, select, swipe, or otherwise interact with the recommended content in a same or similar manner as with other notifications. Selecting the recommended notification can cause the computing device to display additional information, launch an application, or some other action associated with the recommended content.

In this example a fingerprint icon, or other biometric indicator element, can be displayed 714 along with the recommended content on the lock screen. As mentioned, this can indicate that the device is in a locked state, and can prompt use of a fingerprint scanner or other such element to authenticate the user in order to cause the device to become unlocked. While the device is in the locked state, fingerprint data can be received 716 from the fingerprint scanner, such as in response to a finger being placed proximate the scanner, image data (or other sensor data) being acquired, and a fingerprint pattern or features being recognized from the image data. A determination can be made 718 as to whether the fingerprint data is a correct match to the fingerprint data stored for an authorized user of the device. Methods for validating and matching fingerprints are well known in the art and as such will not be discussed in detail herein. If the fingerprint is not a correct match, or if not enough fingerprint data is acquired, etc., then the device can remain in the locked state and the fingerprint icon can remain displayed. In some embodiments a failure notification can be provided indicating that the fingerprint data was unable to be used to successfully authenticate the user to the device, or a different unlock icon can be displayed, among other such options.

If the fingerprint data is correctly matched, or otherwise determined to correspond, to the user fingerprint data and the user is authenticated to the device, then the device can be unlocked and functionality accessible as known for such purposes. In this example, however, instead of removing the lock screen and causing a home screen to be displayed, a countdown element can be caused 720 to be displayed on the lock screen with the advertising, notifications, or other recommended content. Such an approach enables the lock screen to remain displayed for a period of time after a successful unlock action, in order to provide time for a user to view the recommended content. As mentioned, the amount of time can be fixed or determined based upon a current context, such as an amount or type of recommended content displayed, a type of user, a level of user account, and the like. As mentioned, in some embodiments the recommended content may have a specified minimum time for display before other content can be displayed, or there might be a specified amount of time after an authentication that the recommended content should be displayed, among other such options. While the countdown element is displayed, or at other appropriate times, a determination can be made 722 as to whether an action has been detected that will affect the display of the countdown element. This can include, for example, the countdown timer reaching zero seconds remaining, or the remaining time otherwise expiring, at which time the home screen or other appropriate content can be displayed 724 in lieu of the lock screen. Similarly, if a dismiss action is detected, such as the user making a swipe gesture across a touch-sensitive display screen or pressing the home button a second time, then the home screen or other content can be displayed 724 in lieu of the lock screen. In some embodiments the content displayed at the end of a countdown may be different from that displayed as a result of a dismiss action or other such input. If no action is detected and time remains on the countdown element then the lock screen can remain displayed and the countdown element can continue to display the countdown of remaining time. As mentioned, the countdown element can provide a countdown in monotonically decreasing seconds corresponding to the remaining amount of time, although other indicators of progress can be used as well within the scope of the various embodiments.

Figure 8:
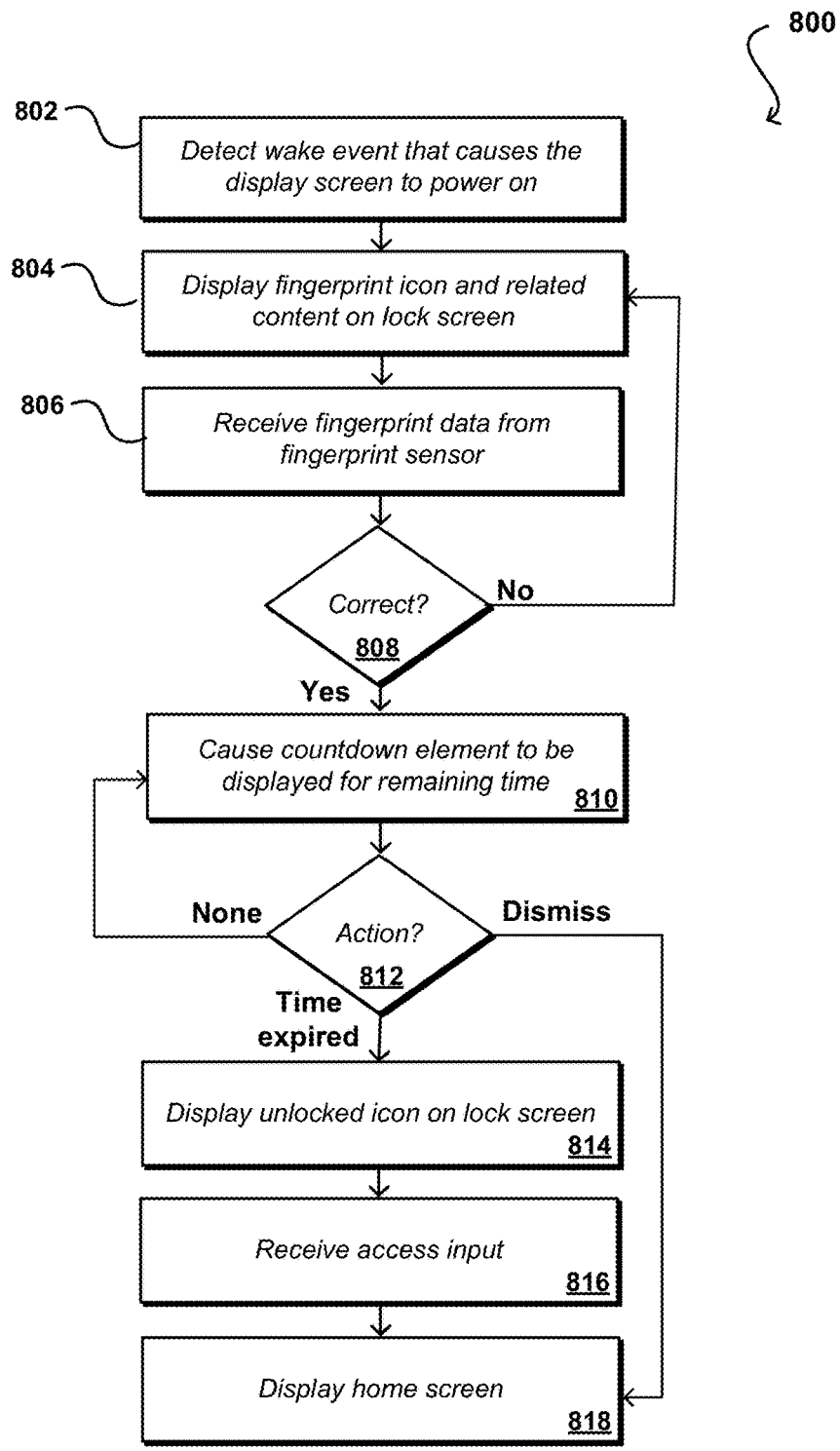
FIG. 8 illustrates a second example process for displaying recommended content on a lock screen of a computing device that is able to be unlocked using a fingerprint scanner in accordance with various embodiments.

FIG. 8 illustrates another example process 800 wherein alternative content is not automatically displayed upon authentication of the user. In this example, a wake event is again detected 802 that causes the display screen to power on. The recommended content and fingerprint icon are displayed 804, as may utilize a selected template as discussed elsewhere herein. The fingerprint icon indicates that the device is locked and can be unlocked using the fingerprint scanner or another appropriate unlock mechanism. Fingerprint data is received 806 from the fingerprint scanner, in response to an appropriate user input action, and the fingerprint data can be analyzed to determine 808 whether the fingerprint data is the correct data to unlock the device, such as where the fingerprint data matches fingerprint data stored for an authorized user of the device as discussed elsewhere herein. Once the device is unlocked in response to a successful unlock action, a countdown element (i.e., a graphical timer or clock icon) can be displayed 810 as discussed elsewhere herein that indicates the amount of time remaining. As mentioned, in at least some embodiments the user can provide an input in order to cause the display to change from the lock screen even if time still remains, at least where the time is not a required or minimum amount of time for the recommended content to be displayed.

During the countdown, or at other appropriate times, a determination can be made 812 as to whether an action is detected that can cause the screen to change the content that is displayed. If no action is detected, the countdown can continue with the lock screen displayed. If a dismiss action is detected, such as a swipe input or home button press, then the home screen or other appropriate content can be displayed 818 in lieu of the lock screen. If the time has expired, or the countdown icon has otherwise reached a state corresponding to no time remaining, an unlock icon can be displayed 814 on the lock screen, alone or with a trust circle or other such element, to indicate to the user that the device is unlocked but another action is required before the lock screen will no longer be displayed (unless the device reaches a sleep or low power state, etc.). Subsequently, an access input can be received 816, such as may be the same as, or different from, a dismiss action. In response, the lock screen can be dismissed and a home screen or other appropriate content can be displayed 818 in place of the lock screen. Various other types of input, such as voice or gesture commands, can be used as well within the scope of the various embodiments. In some embodiments the user can select an advertisement, notification, or other element from the recommended content as part of the access input, which can cause the corresponding content to be displayed and/or action to be taken.

In addition to adjusting the displayed or recommended content based on user action, content displayed for future actions can also be determined or updated. For example, the recommended content to be displayed upon a subsequent wake action can be determined based at least in part upon the identity and/or type of user who last unlocked the device, or the actions that were taken for one or more prior unlocks, such as whether the user allowed the recommended content to be displayed for a minimum period of time. Such actions taken by a user over time can be used to select the types of recommended content to be displayed, as users who are willing to wait might be more likely to view more robust content, while users who quickly swipe away the lock screen might respond better to very brief instances of content. The amount of content might vary as well. Users also can be rewarded for allowing the content to be displayed for a period of time, such as to obtain Easter eggs or supplemental content, discounts or awards, and the like. In some embodiments the countdown timer might be set upon past behavior of a user, such that users who require a significant amount of time receive more time that users who regularly swipe away the lock screen.

Figure 9:
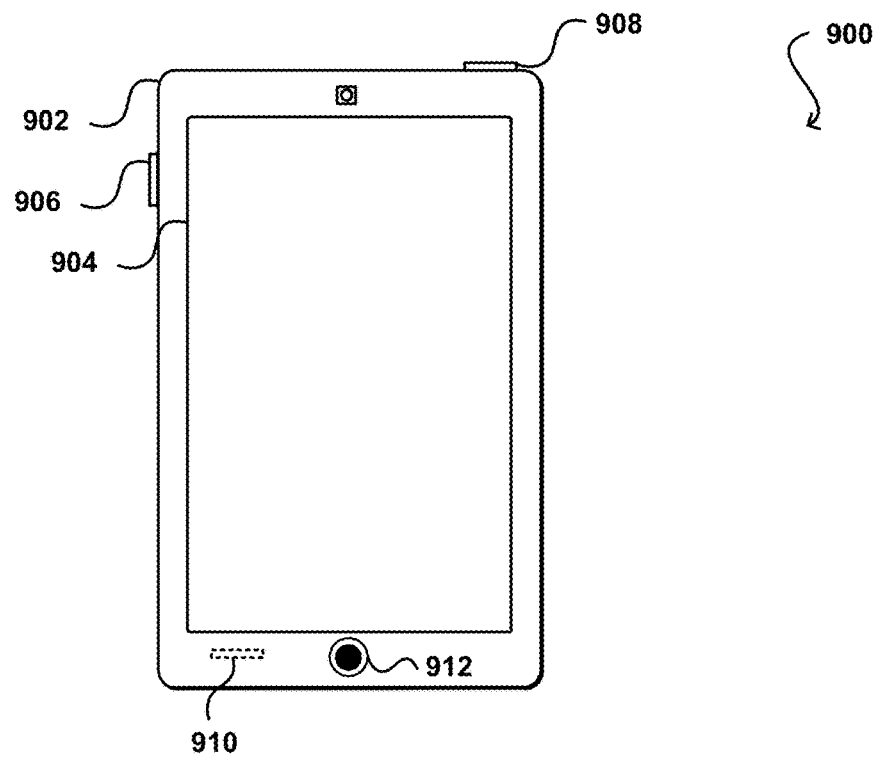
FIG. 9 illustrates an example portable computing device that can be used in accordance with various embodiments.

FIG. 9 illustrates an example computing device 900 (e.g., similar to computing device 108) that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), automobile displays, televisions and/or devices that connect to them (e.g., set top boxes), and portable media players, among others. In this example, the computing device 900 has a display screen 904 and an outer casing 902. The display screen under normal operation will display information to a user (or viewer) facing the display screen (e.g., on the same side of the computing device as the display screen). For example, the display screen can display a lock screen in response to pressing a power button 908, a home button 912, a volume button 906, or in response to another input. In accordance with various embodiments, the home button 912 can be a physical button that when pressed can cause the display screen 904 of the computing device 900 to power on, close an active application, navigate to a home screen, or perform any one of a number of functions based on a number of times the button is pressed, how long the button is held after being pressed, etc. The power button 908 can be a physical button that when pressed can sleep/wake the computing device 900, power on/off the computing device 900, or perform any one of a number of functions based on a number of times the button is pressed, how long the button is held after being pressed, etc. The volume button 906 can be a physical button that when pressed can control a volume of the computing device 900, or perform any one of a number of functions based on a number of times the button is pressed, how long the button is held after being pressed, etc. As discussed herein, the device can include one or more communication components 910, such as may include a cellular communications subsystem, Wi-Fi communications subsystem, BLUETOOTH communication subsystem, near field communication (NFC) subsystem, and the like.

Figure 10:
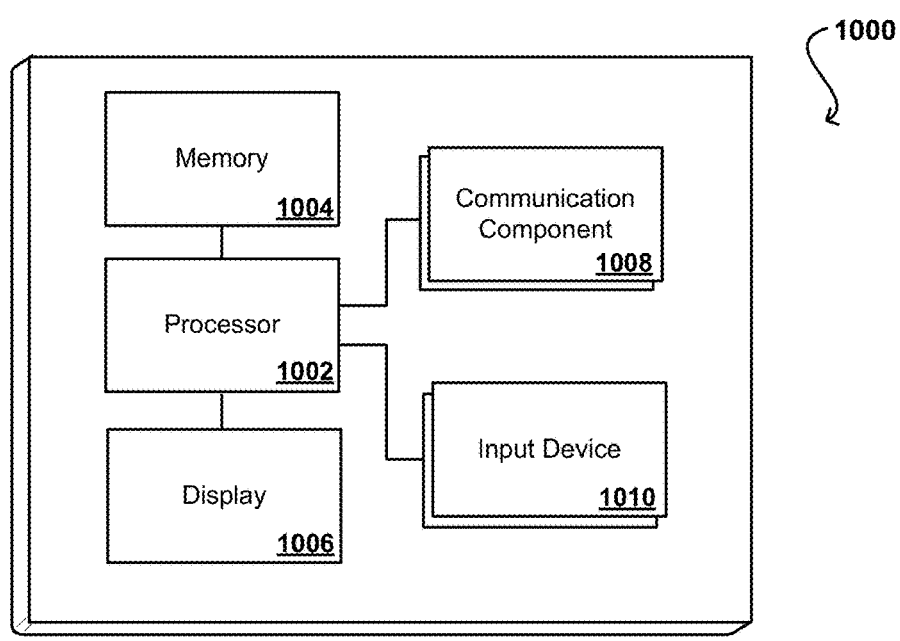
FIG. 10 illustrates an example set of basic components of a portable computing device, such as the device described with respect to FIG. 9.

FIG. 10 illustrates a set of basic components of a computing device 1000 such as the device 902 described with respect to FIG. 9, device 104 described with respect to FIG. 1. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage (e.g., client data store 338) can be used for display instructions, recommended content, images or data, a removable memory can be available for sharing information with other devices, and any number of communication approaches can be available for sharing with other devices. The devices can include a number of sensors, as may include a proximity sensor operable to detect the presence of nearby object without any physical contact, an ambient light sensor for ambient light sensing, a digital compass, among other such sensors. The device typically will include at least one type of display element 1006, such as a touch screen, electronic ink (e-ink), organic light emitting diode (OLED) or liquid crystal display (LCD), although devices such as portable media players might convey information via other means, such as through audio speakers. The device can include at least one communication component 1008, as may enabled wired and/or wireless communication of voice and/or data signals, for example, over a network such as the Internet, a cellular network, a Wi-Fi network, BLUETOOTH, and the like. The device can include at least one additional input device 1010 able to receive conventional input from a user. This conventional input can include, for example, magnetic input from a case, input from a different computing device (e.g., a smart watch), a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
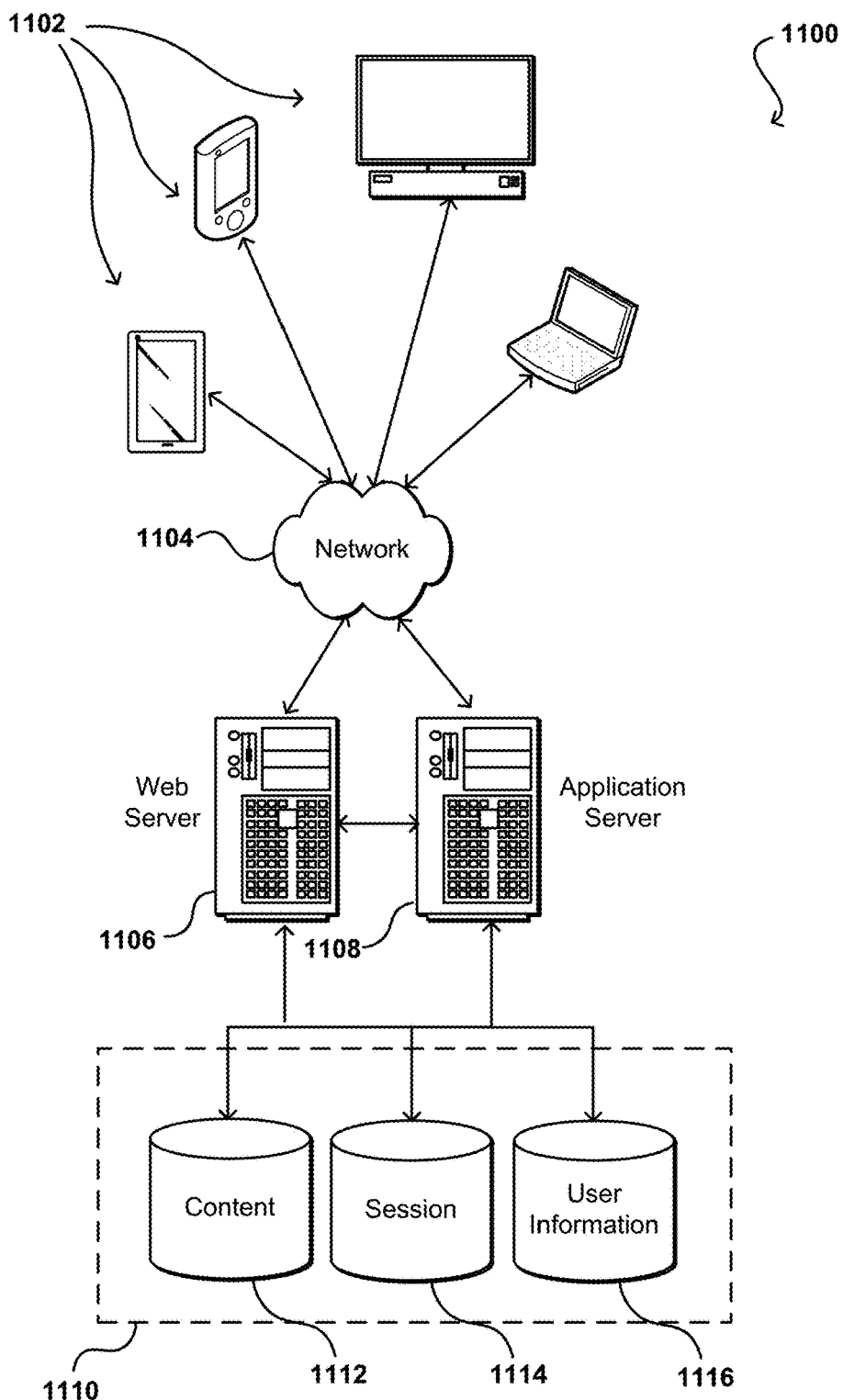
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client devices 1102 (e.g., similar to computing device 108 in FIG. 1A), which can include any appropriate device operable to send and receive requests, messages or information over an appropriate network 1104 (e.g., similar to network 304 of FIG. 3) and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110 (data store 1110 can include, e.g., user data 318, server content 320, log 322, as well as other data.) It should be understood that there can be several application servers, layers or other elements, processes or components, which may be chained or otherwise configured, which can interact to perform tasks such as obtaining data from an appropriate data store. It should be further understood that functions of Web server 1106 and application server 1108 (similar to server(s) 310 of FIG. 3A) can be performed by the same computing device, distributed across multiple computing devices, or any other such arrangement. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116 (e.g., similar to user data 318 of FIG. 3A,) which can be used to serve content for the production side. The data store is also shown to include a mechanism for storing log or session data 1114 (e.g., similar to log 322 of FIG. 3A.) It should be understood that there can be many other aspects that may need to be stored in the data store, such as page image information and access rights information, server content information (e.g., similar to server content 320 of FIG. 3A) which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. The environment can be similar to the environment described with respect to reference 300 of FIG. 3A. In this example, content provider environment 306 can include at least Web server 1106, application server 1108, and data store 1110. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computing device, comprising:
a display element;
a fingerprint scanner;
at least one processor; and
memory including instructions that, when executed by the at least one processor, cause the computing device to:
  detect, while the computing device is in a locked state, a wake event with respect to the computing device, the computing device programmed to restrict access to aspects of the computing device while in the locked state;
  display a lock screen on the display element, the lock screen including at least one instance of recommended content and a fingerprint icon;
  receive fingerprint data via the fingerprint scanner;

cause the computing device to be in an unlocked state in response to authenticating the fingerprint data as corresponding to an authorized user of the computing device;

display a countdown timer element on the lock screen, the countdown timer element indicating a remaining amount of time, of a determined period of time after the authenticating, for which the lock screen and the at least one instance of recommended content are to be displayed on the display element; and display a home screen on the display element of the computing device after reaching the end of the determined period of time.

2. The computing device of claim 1, wherein the instructions when executed further cause the computing device to:

detect, while the computing device is in the locked state, a second wake event with respect to the computing device display the lock screen on the display element;

receive second fingerprint data via the fingerprint scanner;

cause the computing device to be in the unlocked state in response to authenticating the second fingerprint data;

display the countdown timer element on the lock screen;

detect, before the countdown timer element reaches an end state representing an end of the determined period of time, a dismissal action with respect to the computing device; and display a home screen on the display element of the computing device after reaching the end of the determined period of time.

3. The computing device of claim 1, wherein the instructions when executed further cause the computing device to:

cause the countdown timer element to display a remaining number of seconds of the determined period of time, the countdown timer element configured to display the remaining number of seconds in a monotonically decreasing order.

4. The computing device of claim 1, wherein the instructions when executed further cause the computing device to:

display an unlocked icon on the lock screen after reaching the end of the determined period of time, wherein the home screen is displayed upon detecting a dismissal action with respect to the computing device while the unlocked icon is displayed.

5. The computing device of claim 1, wherein the instructions when executed further cause the computing device to:

detect, before the countdown timer element reaches an end state representing an end of the determined period of time, an input action other than a dismissal action performed with respect to the display element; and display an unlocked icon on the lock screen wherein the home screen is displayed upon detecting the dismissal action with respect to the computing device while the unlocked icon is displayed.

6. A computer-implemented method, comprising:

causing a lock screen for a locked state to be displayed on a display element of a computing device, the computing device programmed to restrict access to aspects of the computing device while in the locked state;

determining a user authentication action for the computing device;

causing a countdown element to be displayed after unlocking the computing device, the countdown element indicating a remaining amount of time after the unlocking of the computing device;

detecting an end event; and causing content other than the lock screen to be displayed on the display element of the computing device.

7. The computer-implemented method of claim 6, wherein detecting the end event includes at least one of determining that the remaining amount of time has been reached or detecting a dismissal event.

8. The computer-implemented method of claim 6, further comprising:

causing an unlocked icon to be displayed on the lock screen after the end of the remaining amount of time has been reached;

detecting a dismissal action received to the computing device; and causing the content other than the lock screen to be displayed on the display element.

9. The computer-implemented method of claim 6, further comprising:

verifying that the user authentication action is sufficient to cause the computing device to enter an unlocked state, the user authentication action including an input of biometric data.

10. The computer-implemented method of claim 6, further comprising:

causing the lock screen to be displayed on the display element;

determining a wake event corresponding to the user authentication action;

verifying that the computing device is programmed to enter an unlocked state in response to the user authentication action; and displaying content other than the lock screen without displaying a countdown element.

11. The computer-implemented method of claim 6, further comprising:

determining recommended content to be displayed on the lock screen, the recommended content including at least one of a user notification or promotional content.

12. The computer-implemented method of claim 6, further comprising:

causing the lock screen to be displayed on the display element of a computing device;

determining an unsuccessful unlock action received to the computing device; and displaying an error icon on the lock screen for at least a determined period of time.

13. The computer-implemented method of claim 6, further comprising:

determining a required minimum amount of time for the lock screen to be displayed after the unlocking of the computing device; and preventing the content other than the lock screen from being displayed on the display element at least until the required minimum amount of time has passed.

14. The computer-implemented method of claim 6, further comprising:

determining a pattern with which the user accesses content other than the lock screen on the computing device; and determining at least one of recommended content to display on the lock screen, or a length of time to display the recommended content on the lock screen, based at least in part upon the pattern.

15. A system, comprising:

at least one processor; and memory including instructions that, when executed by the at least one processor, cause the system to:

cause for a locked state to be displayed on a display element of a computing device, the computing device programmed to restrict access to aspects of the computing device while in the locked state;

determine a user authentication action received to the computing device;

cause a countdown element to be displayed after unlocking the computing device, the countdown element indicating a remaining amount of time after the unlocking of the computing device;

detect an end event; and cause content other than the lock screen to be displayed on the display element of the computing device.

16. The system of claim 15, wherein detecting the end event includes at least one of determining that the remaining amount of time has been reached or detecting a dismissal event.

17. The system of claim 15, wherein the instructions when executed further cause the system to:

cause an unlocked icon to be displayed on the lock screen after the end of the remaining amount of time has been reached;

detect a dismissal action received to the computing device; and cause the content other than the lock screen to be displayed on the display element.

18. The system of claim 15, wherein the instructions when executed further cause the system to:

verify that the unlock action is sufficient to cause the computing device to enter an unlocked state, the unlock action including an input of biometric data.

19. The system of claim 15, wherein the instructions when executed further cause the system to:

cause the lock screen to be displayed on the display element of a computing device;

determine an unsuccessful unlock action received to the computing device; and display an error icon on the lock screen for at least a determined period of time.

20. The system of claim 15, wherein the instructions when executed further cause the system to:

determine a required minimum amount of time for the lock screen to be displayed after the unlocking of the computing device; and prevent the content other than the lock screen from being displayed on the display element at least until the required minimum amount of time has passed.

* * * * *